United States Patent
Fujii et al.

(10) Patent No.: US 8,472,096 B2
(45) Date of Patent: Jun. 25, 2013

(54) METHOD OF MANUFACTURING OSCILLATOR DEVICE, AND OPTICAL DEFLECTOR AND OPTICAL INSTRUMENT WITH OSCILLATOR DEVICE

(75) Inventors: Kazunari Fujii, Kawasaki (JP); Takahisa Kato, Tokyo (JP); Yoshio Hotta, Kamakura (JP); Suguru Miyagawa, Tokyo (JP); Takahiro Akiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 719 days.

(21) Appl. No.: 12/674,325

(22) PCT Filed: Nov. 13, 2008

(86) PCT No.: PCT/JP2008/071066
§ 371 (c)(1),
(2), (4) Date: Feb. 19, 2010

(87) PCT Pub. No.: WO2009/064024
PCT Pub. Date: May 22, 2009

(65) Prior Publication Data
US 2011/0116145 A1    May 19, 2011

(30) Foreign Application Priority Data
Nov. 14, 2007    (JP) .................................. 2007-295960

(51) Int. Cl.
*G02B 26/08* (2006.01)
(52) U.S. Cl.
USPC ..................... 359/199.1; 359/224.1; 359/900; 310/36
(58) Field of Classification Search
USPC .......... 359/198.1–199.4, 200.6–200.8, 221.2, 359/224.1–224.2; 310/36–37, 66; 318/119
See application file for complete search history.

(56) References Cited

U.S. PATENT DOCUMENTS

| 5,047,630 A | 9/1991 | Confer et al. |
| 5,483,059 A | 1/1996 | Igaki et al. |
| 5,969,465 A | 10/1999 | Neukermans et al. |
| 6,256,131 B1 | 7/2001 | Wine et al. |

(Continued)

FOREIGN PATENT DOCUMENTS

| JP | 2002-40355 | 2/2002 |
| JP | 2004-109651 | 4/2004 |

(Continued)

OTHER PUBLICATIONS

Chinese Office Action dated Apr. 25, 2011.

*Primary Examiner* — James Phan
(74) *Attorney, Agent, or Firm* — Fitzpatrick, Cella, Harper & Scinto

(57) ABSTRACT

A method of manufacturing an oscillator device having first and second oscillators being driven at first and second driving resonance frequencies gf1 and gf2, the method including a first step for processing the two oscillators, wherein, when the two oscillators are going to be processed as oscillators having first and second resonance frequencies different from the two driving resonance frequencies with a certain dispersion range, the two oscillators are so processed that the first and second resonance frequencies different from the two driving resonance frequencies become equal to first and second resonance frequencies f1 and f2, respectively, which are included in adjustable resonance frequency ranges, respectively, and a second step for adjusting the first and second resonance frequencies f1 and f2 so that they become equal to the first and second driving resonance frequencies gf1 and gf2, respectively.

6 Claims, 6 Drawing Sheets

U.S. PATENT DOCUMENTS

| | | | |
|---|---|---|---|
| 6,270,224 B1 | 8/2001 | Sunaga et al. | |
| 6,278,553 B1 | 8/2001 | Akiyama | |
| 6,327,087 B1 | 12/2001 | Hashimoto et al. | |
| 6,335,837 B1 | 1/2002 | Aratani et al. | |
| 6,900,925 B2 | 5/2005 | Kato et al. | |
| 7,038,834 B2 | 5/2006 | Kato et al. | |
| 7,149,017 B2 | 12/2006 | Kandori et al. | |
| 7,220,009 B2 | 5/2007 | Shimada et al. | |
| 7,242,506 B2 | 7/2007 | Kandori et al. | |
| 7,271,943 B2 | 9/2007 | Yasuda et al. | |
| 7,310,176 B2 | 12/2007 | Kato et al. | |
| 7,355,774 B2 | 4/2008 | Kato et al. | |
| 7,388,702 B2 | 6/2008 | Yasuda et al. | |
| 7,423,795 B2 | 9/2008 | Kato et al. | |
| 7,446,920 B2 | 11/2008 | Kato et al. | |
| 7,474,452 B2 | 1/2009 | Yasuda et al. | |
| 7,518,774 B2 | 4/2009 | Kato et al. | |
| 7,643,197 B2 | 1/2010 | Kato et al. | |
| 7,656,570 B2 | 2/2010 | Torashima et al. | |
| 2003/0161020 A1* | 8/2003 | Wine et al. | 359/198 |
| 2005/0173770 A1 | 8/2005 | Linden et al. | |
| 2005/0179976 A1 | 8/2005 | Davis et al. | |
| 2005/0253055 A1 | 11/2005 | Sprague et al. | |
| 2005/0280879 A1 | 12/2005 | Gibson et al. | |
| 2007/0109560 A1 | 5/2007 | Sprague et al. | |
| 2007/0115072 A1 | 5/2007 | Kato et al. | |
| 2008/0042052 A1 | 2/2008 | Sprague et al. | |
| 2008/0143196 A1 | 6/2008 | Sprague et al. | |
| 2008/0316560 A1 | 12/2008 | Kandori et al. | |
| 2009/0027748 A1 | 1/2009 | Sprague et al. | |
| 2009/0134319 A1 | 5/2009 | Sprague et al. | |
| 2010/0002277 A1 | 1/2010 | Ushijima et al. | |
| 2010/0092213 A1 | 4/2010 | Fujii et al. | |

FOREIGN PATENT DOCUMENTS

| | | |
|---|---|---|
| JP | 2005-208578 | 8/2005 |
| JP | 2006-195290 | 7/2006 |
| JP | 2007525025 A | 8/2007 |
| JP | 2004-219889 | 4/2010 |
| WO | 2007/094489 | 8/2007 |

* cited by examiner

METHOD OF MANUFACTURING OSCILLATOR DEVICE, AND OPTICAL DEFLECTOR AND OPTICAL INSTRUMENT WITH OSCILLATOR DEVICE

TECHNICAL FIELD

This invention relates to a method of manufacturing an oscillator device, and to an optical deflector and an optical instrument comprised of an oscillator device manufactured by that manufacturing method.

The present invention concerns a technique for accomplishing, for example, an oscillator device suitably applicable to an optical instrument including a projection display device for projecting an image base on scanning deflection of light and an image forming apparatus such as a laser beam printer, a digital copying machine or the like having an electrophotographic process.

BACKGROUND ART

In recent years, various proposals have been made with regard to optical scanning optical systems (and optical scanning devices) for scanningly deflecting light wherein an optical deflector is constituted by using an oscillator device configured to provide sinusoidal vibration based on the resonance phenomenon.

The optical scanning optical systems with such resonance type optical deflector have the following features, as compared with an optical scanning optical system using a rotary polygonal mirror such as a polygon mirror.

Namely, the size of the optical deflecting device can be made quite small, and the electric power consumption can be made very slow.

On the other hand, in the resonance type deflector mentioned above, since the deflection angle (displacement angle) of the mirror changes theoretically sinusoidally, the angular speed is not constant.

Conventionally, in an attempt to correcting the characteristic of the resonance type deflector such as described above, U.S. Pat. No. 5,047,630 and U.S. Pat. No. 7,271,943 have proposed an optical deflector as follows.

In U.S. Pat. No. 5,047,630, a resonance type deflector having oscillation modes of a fundamental frequency and a frequency three-fold the fundamental frequency is used to realize the chopping wave driving.

FIG. 8 illustrates a micromirror which realizes approximately chopping-wave-like driving in the U.S. Pat. No. 5,047,630.

As shown in FIG. 8, an optical deflecting device 12 here comprises oscillators 14 and 16, torsion springs 18 and 20, driving members 23 and 50, detecting elements 15 and 32, and a control circuit 30.

This micromirror has a fundamental resonance frequency and a resonance frequency of approximately three-fold the same, and it drives with a resultant frequency of the fundamental frequency and the triple frequency.

With this arrangement, the oscillator 14 having a mirror surface is driven by chopping wave driving, and optical deflection can be done with a deflection angle in which the change of the angular speed is fewer than the sinusoidal driving.

In operation, the oscillation of the oscillator 14 is detected by the detecting elements 15 and 32, and a necessary driving signal for the chopping wave driving is generated by the control circuit 30. Through the driving members 23 and 50, the micromirror is driven.

On the other hand, U.S. Pat. No. 7,271,943 discloses a micro-oscillator in which a system including a plurality of torsion springs and a plurality of movable elements has a plurality of discrete natural oscillation modes.

In this micro-oscillator, in the plurality of discrete natural oscillation modes, a reference oscillation mode which is a natural oscillation mode of a reference frequency and an even-multiple oscillation mode which is a there is the even multiple that is the of natural oscillation mode of a frequency approximately an N-fold the reference frequency (N is an even number) are included.

In U.S. Pat. No. 7,271,943, the micro-oscillator is oscillated in these oscillation modes, whereby sawtooth wave driving is realized.

On the other hand, in resonance type deflectors, the resonance frequency of the oscillator device would have dispersion due to manufacturing errors.

For lower power consumption, driving around the resonance frequency is desirable. Therefore, tuning of the resonance frequency is necessary.

Furthermore, in an image forming apparatus using an optical deflector comprised of such actuator, for stabilized aspect ratio of the image and lower deterioration of the picture quality, there is a necessity of tuning the resonance frequency of the optical deflector to a predetermined value.

Conventionally, for adjustment of the resonance frequency such as mentioned above, Japanese Laid-Open Patent Application No. 2002-40355 and Japanese Laid-Open Patent Application No. 2004-219889 have proposed a planar type galvano mirror or an oscillation mirror as follows.

Japanese Laid-Open Patent Application No. 2002-40355 uses, as shown in FIG. 9, a planar type galvano mirror having mass loading members 1001 and 1002 formed at the opposite ends of a movable plate which is comprised of an electric coil and a reflection surface resiliently supported around a torsion axis for oscillation.

The mass is removed by irradiating a laser beam to the mass loading members 1001 and 1002 of this galvano mirror or, alternatively, a resin is applied to enlarge the mass, whereby the inertia moment is adjusted to tune the frequency at a predetermined value.

Furthermore, Japanese Laid-Open Patent Application No. 2004-219889 uses a method in which the resonance frequency of the oscillator device is set slightly high beforehand and, by adding a mass to a portion of the oscillator, the resonance frequency is tuned to a desired level.

DISCLOSURE OF THE INVENTION

In oscillator devices using the resonance phenomenon described above, due to dimensional errors caused during the manufacturing process, dispersion of resonance frequency (natural oscillation mode frequency) is present among individual oscillator devices. These resonance frequencies should be tuned to a target resonance frequency.

However, any of the conventional methods mentioned above is unable to adjust an oscillator device having two resonance frequencies to a target resonance frequency, satisfactorily.

For example, in the oscillator device having two resonance frequencies disclosed in U.S. Pat. No. 5,047,630 and U.S. Pat. No. 7,271,943, the resonance frequency is set in an integral-multiple relation as of 2000 Hz and 4000 Hz, for example, and by driving the oscillator at these resonance frequencies, the angular speed is corrected.

On the other hand, in order to adjust the oscillator device having these two resonance frequencies to a target resonance frequency, if the two resonance frequencies are not covered by an adjustable range, it is unable to adjust it to a predetermined target resonance frequency and, thus, the yield will drop.

The methods described in U.S. Pat. No. 5,047,630 and U.S. Pat. No. 7,271,943 do not care about these points.

Furthermore, Japanese Laid-Open Patent Application No. 2002-40355 and Japanese Laid-Open Patent Application No. 2004-219889 mentioned above relate to adjustment of the resonance frequency of a single oscillator device, and these do not care about the adjustment of resonance frequencies of an oscillator device having two resonance frequencies.

For adjustment of resonance frequencies of an oscillator device having two resonance frequencies, if the adjustment is to be carried out by mass removal or mass addition, a plurality of parameters must be taken into consideration. Furthermore, if the two resonance frequencies are not covered by the adjustable range as mentioned above, the frequency cannot be adjusted to a predetermined resonance frequency, and it leads to the yield drop. The method described in Japanese Laid-Open Patent Application No. 2002-40355 and Japanese Laid-Open Patent Application No. 2004-219889 do not care about these points.

The present invention provides a method of manufacturing an oscillator device having two resonance frequencies by which the two resonance frequencies can easily be adjusted into an adjustable range based on an adjustment step of either removing a mass or adding a mass and by which the yield can be improved.

The present invention in another aspect provides an optical deflector and an optical instrument, comprised of an oscillator device manufactured by that manufacturing method.

In accordance with an aspect of the present invention, there is provided a method of manufacturing an oscillator device having first and second oscillators supported by a fixed member for torsional oscillation around a torsional axis through first and second torsion springs, the oscillator device being driven at first and second driving resonance frequencies gf1 and gf2, said method comprising: a first step for processing the two oscillators, wherein, when the two oscillators are going to be processed as oscillators having first and second resonance frequencies different from the two driving resonance frequencies with a certain dispersion range, the two oscillators are so processed that the first and second resonance frequencies different from the two driving resonance frequencies become equal to first and second resonance frequencies f1 and f2, respectively, which are included in adjustable resonance frequency ranges, respectively; and a second step for adjusting the first and second resonance frequencies f1 and f2 so that they become equal to the first and second driving resonance frequencies gf1 and gf2, respectively.

In one preferred form of this aspect of the present invention, when minimums at a lower limit side of resonance frequency dispersion ranges of the first and second resonance frequencies f1 and f2 are denoted by f1a and f2a, respectively, and maximums at an upper limit side of those ranges are denoted by f1b and f2b and when the first and second resonance frequencies f1 and f2 have dispersion ranges expressed by $f1a < f1 < f1b$ $f2a < f2 < f2b,$ said method comprises a step of processing said oscillator device so that the first and second driving resonance frequencies gf1 and gf2 satisfy relations $gf1 < f1a$, and $gf2 < f2a$ or $gf1 > f1b$, and $gf2 > f2b.$ For adjustment of the first and second resonance frequencies f1 and f2 at said second step, a mass of at least one oscillator may be removed to perform the adjustment.

For adjustment of the first and second resonance frequencies f1 and f2 at said second step, a mass may be added to at least one oscillator to perform the adjustment.

In one preferred form, for manufacture of the oscillator device at said first step, when first and second spring constants of the first and second torsion springs under the first and second driving resonance frequencies gf1 and gf2 are denoted by k1 and k2, respectively, minimums at a lower limit side of the first and second spring constants are denoted by k1a and k2a, respectively, and maximums at an upper limit side of them are denoted by k1b and k2b, respectively, and where the first and second torsion springs are made in spring constant ranges which are expressed by $k1a < k1 < k1b$ $k2a < k2 < k2b,$ the oscillator device is made so that the first and second resonance frequencies f1 and f2 of all oscillators to be produced individually are put in resonance frequency ranges which satisfy equation (1) to equation (4) below:

$$f2 \geq \frac{1}{2\pi}\sqrt{\frac{k1b}{I1}\left(1 + \frac{k2a}{k1b - 4f1^2 I1 \pi^2}\right)} \quad (1)$$

wherein $$I1 = \frac{gf1^2 k1b k2a + gf2^2 k1b k2a + \sqrt{k1b k2a^2(gf1^4 k1b + gf2^4 k1b - 2gf1^2 gf2^2 (k1b + 2k2a))}}{8 gf1^2 gf2^2 k2a \pi^2}$$

$$f2 \leq \frac{1}{2\pi}\sqrt{-\frac{k1a k2b(k2b - 4f1^2 I2 \pi^2)}{I2(-k1a k2b + 4f1^2 I2(k1a + k2b)\pi^2)}} \quad (2)$$

wherein $$I2 = \frac{gf1^2 k1a k2b + gf2^2 k1a k2b - \sqrt{k1a k2b^2(gf1^4 k1a + gf2^4 k1a - 2gf1^2 gf2^2 (k1a + 2k2b))}}{8 gf1^2 gf2^2 (k1a + k2b)\pi^2}$$

$$f1 < gf1 \quad (3)$$

$$f2 < gf2. \quad (4)$$

In one preferred from, for manufacture of the oscillator device at said first step, when first and second spring constants of the first and second torsion springs under the first and second driving resonance frequencies gf1 and gf2 are denoted by k1 and k2, respectively, minimums at a lower limit side of the first and second spring constant are denoted by k1a and k2a, respectively, and maximums at an upper limit side of them are denoted by k1b and k2b, respectively, the first and second torsion springs are made in spring constant ranges which are expressed by $k1a < k1 < k1b$ $k2a < k2 < k2b,$ and wherein, when the center of the range of the spring constant k1 is at k1c while the center of the range of the spring constant k2 is at k2c, and when first and second production target resonance frequencies for processing the oscillator device to obtain the first and second resonance frequencies f1 and f2 are denoted by tf1 and tf2, respectively, said method comprises a step of calculating tf1 in accordance with equation (5) below and calculating tf2 in accordance with equation (6) below, and processing the oscillator device so that the calculated tf1 and tf2 are reached:

$$tf1 = \sqrt{\frac{I2\,k1c + I1\,k2c + I2\,k2c - \sqrt{-4\,I1\,I2\,k1c\,k2c + (I1\,k2c + I2(k1c+k2c))^2}}{8\,I1\,I2\pi^2}} \quad (5)$$

wherein $$I1 = \frac{gf1^2 k1b\,k2a + gf2^2 k1b\,k2a + \sqrt{k1b\,k2a^2(gf1^4 k1b + gf2^4 k1b - 2\,gf1^2\,gf2^2(k1b+2\,k2a))}}{8\,gf1^2 gf2^2 k2a\pi^2}$$

$$I2 = \frac{gf1^2 k1b\,k2a + gf2^2 k1b\,k2a - \sqrt{k1b\,k2a^2(gf1^4 k1b + gf2^4 k1b - 2\,gf1^2\,gf2^2(k1b+2\,k2a))}}{8\,gf1^2 gf2^2 (k1b+k2a)\pi^2}$$

$$tf2 = \sqrt{\frac{I2\,k1c + I1\,k2c + I2\,k2c + \sqrt{-4\,I1\,I2\,k1c\,k2c + (I1\,k2c + I2(k1c+k2c))^2}}{8\,I1\,I2\pi^2}} \quad (6)$$

wherein $$I1 = \frac{gf1^2 k1a\,k2b + gf2^2 k1a\,k2b + \sqrt{k1a\,k2b^2(gf1^4 k1a + gf2^4 k1a - 2\,gf1^2\,gf2^2(k1a+2\,k2b))}}{8\,gf1^2 gf2^2 k2b\pi^2}$$

$$I2 = \frac{gf1^2 k1a\,k2b + gf2^2 k1a\,k2b - \sqrt{k1a\,k2b^2(gf1^4 k1a + gf2^4 k1a - 2\,gf1^2\,gf2^2(k1a+2\,k2b))}}{8\,gf1^2 gf2^2 (k1a+k2b)\pi^2}$$

In one preferred from, for manufacture of the oscillator device at said first step, when first and second spring constants of the first and second torsion springs under the first and second driving resonance frequencies gf1 and gf2 are denoted by k1 and k2, respectively, minimums at a lower limit side of the first and second spring constant are denoted by k1a and k2a, respectively, and maximums at an upper limit side of them are denoted by k1b and k2b, respectively, the first and second torsion springs are made in spring constant ranges which are expressed by $k1a < k1 < k1b$ $k2a < k2 < k2b,$ wherein, when the inertia moments of the first and second oscillators under the driving resonance frequencies gf1 and gf2 are denoted by I1 and I2, respectively, minimums at a lower limit side of the first and the second inertia moments are denoted by I1−I1e and I2−I2e, respectively, while maximums of them at an upper limit side are denoted by I1+I1e and I2+I2e, respectively, the first and second oscillators are made in inertia moment ranges which are expressed by $I1-I1e < I1 < I1+I1e$ $I2-I2e < I2 < I2+I2e,$ and wherein, when the center of the aforementioned range of spring constant k1 is at k1c, the center of the aforementioned range of spring constant k2 is at k2c, and first and second production target resonance frequencies for processing the oscillator device to obtain the resonance frequencies f1 and f2 are denoted by tf1 and tf2, respectively, said method comprises a step of calculating tf1 in accordance with equation (7) below and calculating tf2 in accordance with equation (8) below, and processing the oscillator device so that the calculated tf1 and tf2 are reached:

$$tf1 = \sqrt{\frac{I2\,k1c + I1\,k2c + I2\,k2c - \sqrt{-4\,I1\,I2\,k1c\,k2c + (I1\,k2c + I2(k1c+k2c))^2}}{8\,I1\,I2\pi^2}} \quad (7)$$

wherein $$I1 = \frac{gf1^2 k1b\,k2a + gf2^2 k1b\,k2a + \sqrt{k1b\,k2a^2(gf1^4 k1b + gf2^4 k1b - 2\,gf1^2\,gf2^2(k1b+2\,k2a))}}{8\,gf1^2 gf2^2 k2a\pi^2} + I1e$$

$$I2 = \frac{gf1^2 k1b\,k2a + gf2^2 k1b\,k2a - \sqrt{k1b\,k2a^2(gf1^4 k1b + gf2^4 k1b - 2\,gf1^2\,gf2^2(k1b+2\,k2a))}}{8\,gf1^2 gf2^2 (k1b+k2a)\pi^2} + I2e$$

$$tf2 = \sqrt{\frac{I2\,k1c + I1\,k2c + I2\,k2c + \sqrt{-4\,I1\,I2\,k1c\,k2c + (I1\,k2c + I2(k1c+k2c))^2}}{8\,I1\,I2\pi^2}} \quad (8)$$

wherein $$I1 = \frac{gf1^2 k1a\,k2b + gf2^2 k1a\,k2b + \sqrt{k1a\,k2b^2(gf1^4 k1a + gf2^4 k1a - 2\,gf1^2\,gf2^2(k1a+2\,k2b))}}{8\,gf1^2 gf2^2 k2b\pi^2} + I1e$$

$$I2 = \frac{gf1^2 k1a\,k2b + gf2^2 k1a\,k2b - \sqrt{k1a\,k2b^2(gf1^4 k1a + gf2^4 k1a - 2\,gf1^2\,gf2^2(k1a+2\,k2b))}}{8\,gf1^2 gf2^2 (k1a+k2b)\pi^2} + I2e$$

In one preferred from, for manufacture of the oscillator device at said first step, when first and second spring constants of the first and second torsion springs under the first and second driving resonance frequencies gf1 and gf2 are denoted by k1 and k2, respectively, minimums at a lower limit side of the first and second spring constant are denoted by k1a and k2a, respectively, and maximums at an upper limit side of them are denoted by k1b and k2b, respectively, and where the first and second torsion springs are made in spring constant ranges which are expressed by $k1a < k1 < k1b$ $k2a < k2 < k2b,$ the oscillator device is manufactured so that the first and second resonance frequencies f1 and f2 of all oscillators to be produced individually are put in resonance frequency ranges which satisfy equation (9) to equation (12) below:

$$f2 \leq \frac{1}{2\pi}\sqrt{\frac{k1a}{I1}\left(1 + \frac{k2b}{k1a - 4f1^2 I1\pi^2}\right)} \quad (9)$$

wherein $$I1 = \frac{gf1^2 k1a\, k2b + gf2^2 k1a\, k2b + \sqrt{k1a\, k2b^2(gf1^4 k1a + gf2^4 k1a - 2gf1^2 gf2^2(k1a + 2k2b))}}{8\, gf1^2 gf2^2 k2b\pi^2}$$

$$f2 \geq \frac{1}{2\pi}\sqrt{-\frac{k1b\, k2a(k2a - 4f1^2 I2\pi^2)}{I2(-k1b\, k2a + 4f1^2 I2(k1b + k2a)\pi^2)}} \quad (10)$$

wherein $$I2 = \frac{gf1^2 k1b\, k2a + gf2^2 k1b\, k2a - \sqrt{k1b\, k2a^2(gf1^4 k1b + gf2^4 k1b - 2gf1^2 gf2^2(k1b + 2k2a))}}{8\, gf1^2 gf2^2(k1b + 2k2a)\pi^2}$$

$$f1 > gf1 \quad (11)$$

$$f2 > gf2 \quad (12)$$

In one preferred form, for manufacture of the oscillator device at said first step, when first and second spring constants of the first and second torsion springs under the first and second driving resonance frequencies gf1 and gf2 are denoted by k1 and k2, respectively, minimums at a lower limit side of the first and second spring constant are denoted by k1a and k2a, respectively, and maximums at an upper limit side of them are denoted by k1b and k2b, respectively, the first and second torsion springs are made in spring constant ranges which are expressed by $$k1a < k1 < k1b$$

$$k2a < k2 < k2b,$$

and wherein, when the center of the range of the spring constant k1 is at k1c while the center of the range of the spring constant k2 is at k2c, and when first and second production target resonance frequencies for processing the oscillator device to obtain the first and second resonance frequencies f1 and f2 are denoted by tf1 and tf2, respectively, said method comprises a step of calculating tf1 in accordance with equation (13) below and calculating tf2 in accordance with equation (14) below, and processing the oscillator device so that the calculated tf1 and tf2 are reached:

$$tf1 = \sqrt{\frac{I2\, k1c + I1\, k2c + I2\, k2c - \sqrt{-4 I1\, I2\, k1c\, k2c + (I1\, k2c + I2(k1c + k2c))^2}}{8\, I1\, I2\pi^2}} \quad (13)$$

wherein $$I1 = \frac{gf1^2 k1a\, k2b + gf2^2 k1a\, k2b + \sqrt{k1a\, k2b^2(gf1^4 k1a + gf2^4 k1a - 2gf1^2 gf2^2(k1a + 2k2b))}}{8\, gf1^2 gf2^2 k2b\pi^2}$$

$$I2 = \frac{gf1^2 k1a\, k2b + gf2^2 k1a\, k2b - \sqrt{k1a\, k2b^2(gf1^4 k1a + gf2^4 k1a - 2gf1^2 gf2^2(k1a + 2k2b))}}{8\, gf1^2 gf2^2(k1a + k2b)\pi^2}$$

$$tf2 = \sqrt{\frac{I2\, k1c + I1\, k2c + I2\, k2c + \sqrt{-4 I1\, I2\, k1c\, k2c + (I1\, k2c + I2(k1c + k2c))^2}}{8\, I1\, I2\pi^2}} \quad (14)$$

wherein $$I1 = \frac{gf1^2 k1b\, k2a + gf2^2 k1b\, k2a + \sqrt{k1b\, k2a^2(gf1^4 k1b + gf2^4 k1b - 2gf1^2 gf2^2(k1b + 2k2a))}}{8\, gf1^2 gf2^2 k2a\pi^2}$$

$$I2 = \frac{gf1^2 k1b\, k2a + gf2^2 k1b\, k2a - \sqrt{k1b\, k2a^2(gf1^4 k1b + gf2^4 k1b - 2gf1^2 gf2^2(k1b + 2k2a))}}{8\, gf1^2 gf2^2(k1b + k2a)\pi^2}$$

In one preferred from, for manufacture of the oscillator device at said first step, when first and second spring constants of the first and second torsion springs under the first and second driving resonance frequencies gf1 and gf2 are denoted by k1 and k2, respectively, minimums at a lower limit side of the first and second spring constant are denoted by k1a and k2a, respectively, and maximums at an upper limit side of them are denoted by k1b and k2b, respectively, the first and second torsion springs are made in spring constant ranges which are expressed by $$k1a < k1 < k1b$$

$$k2a < k2 < k2b,$$

wherein, when the inertia moments of the first and second oscillators under the driving resonance frequencies gf1 and gf2 are denoted by I1 and I2, respectively, minimums at a lower limit side of the first and the second inertia moments are denoted by I1−I1e and I2−I2e, respectively, while maximums of them at an upper limit side are denoted by I1+I1e and I2+I2e, respectively, the first and second oscillators are made in inertia moment ranges which are expressed by $$I1 - I1e < I1 < I1 + I1e$$

$$I2 - I2e < I2 < I2 + I2e,$$

and wherein, when the center of the aforementioned range of spring constant k1 is at k1c, the center of the aforementioned range of spring constant k2 is at k2c, and first and second production target resonance frequencies for processing the oscillator device to obtain the resonance frequencies f1 and f2 are denoted by tf1 and tf2, respectively, said method comprises a step of calculating tf1 in accordance with equation (15) below and calculating tf2 in accordance with equation (16) below, and processing the oscillator device so that the calculated tf1 and tf2 are reached:

$$tf1 = \sqrt{\dfrac{I2\,k1c + I1\,k2c + I2\,k2c - \sqrt{-4\,I1\,I2\,k1c\,k2c + (I1\,k2c + I2(k1c + k2c))^2}}{8\,I1\,I2\pi^2}}$$ (15)

wherein $$I1 = \dfrac{gf1^2 k1a\,k2b + gf2^2 k1a\,k2b + \sqrt{k1a\,k2b^2(gf1^4 k1a + gf2^4 k1a - 2\,gf1^2\,gf2^2(k1a + 2k2b))}}{8\,gf1^2 gf2^2 k2b\pi^2} - I1e$$

$$I2 = \dfrac{gf1^2 k1a\,k2b + gf2^2 k1a\,k2b - \sqrt{k1a\,k2b^2(gf1^4 k1a + gf2^4 k1a - 2\,gf1^2\,gf2^2(k1a + 2k2b))}}{8\,gf1^2 gf2^2 (k1a + k2b)\pi^2} - I2e$$

$$tf2 = \sqrt{\dfrac{I2\,k1c + I1\,k2c + I2\,k2c + \sqrt{-4\,I1\,I2\,k1c\,k2c + (I1\,k2c + I2(k1c + k2c))^2}}{8\,I1\,I2\pi^2}}$$ (16)

wherein $$I1 = \dfrac{gf1^2 k1b\,k2a + gf2^2 k1b\,k2a + \sqrt{k1b\,k2a^2(gf1^4 k1b + gf2^4 k1b - 2\,gf1^2\,gf2^2(k1b + 2k2a))}}{8\,gf1^2 gf2^2 k2a\pi^2} - I1e$$

$$I2 = \dfrac{gf1^2 k1b\,k2a + gf2^2 k1b\,k2a - \sqrt{k1b\,k2a^2(gf1^4 k1b + gf2^4 k1b - 2\,gf1^2\,gf2^2(k1b + 2k2a))}}{8\,gf1^2 gf2^2 (k1b + k2a)\pi^2} - I2e$$

The first and second driving resonance frequencies gf1 and gf2 may be in an N-fold relationship where N is an integer.

The first and second driving resonance frequencies gf1 and gf2 may be in a relationship of 1:2.

In accordance with another aspect of the present invention, there is provided an optical deflector, comprising: an oscillator device manufactured in accordance with the oscillator device manufacturing method as recited above; and an optical deflection element disposed on the oscillator of said oscillator device.

In accordance with a further aspect of the present invention, there is provided an optical instrument, comprising: a light source; a photosensitive member or an image display member; and an optical deflector as recited above, wherein light from said light source is deflected by said optical deflector so that at least a portion of the light is incident on said photosensitive member or said image display member.

These and other objects, features and advantages of the present invention will become more apparent upon a consideration of the following description of the preferred embodiments of the present invention taken in conjunction with the accompanying drawings.

BEST MODE FOR PRACTICING THE INVENTION

Figure 1:
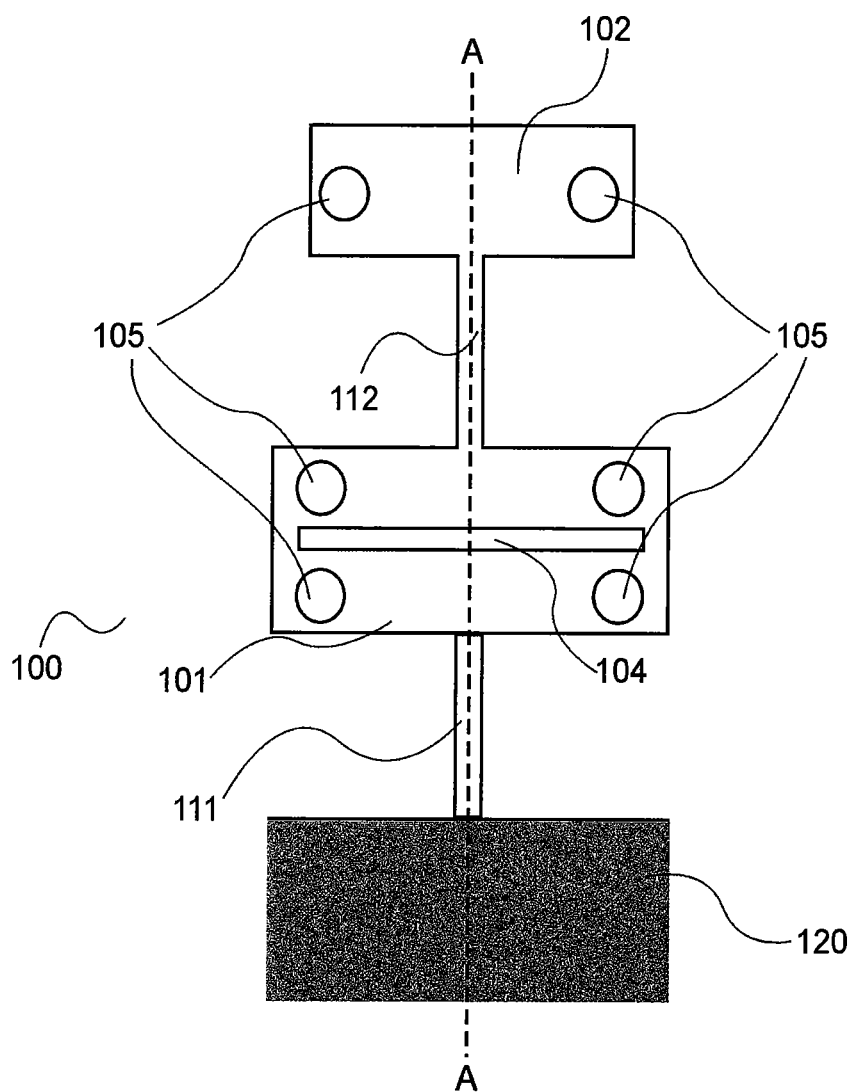
FIG. 1 is a diagram for explaining a structural example of an oscillator device according to a first embodiment of the present invention.

Preferred embodiments of the present invention will now be described with reference to the attached drawings.

First, one preferred form of an oscillator device manufacturing method of the present invention will be described.

A first oscillator of the oscillator device is fixed to a fixed member for torsional oscillation by a first resilient supporting member. The oscillator and a second oscillator are coupled for torsional oscillation by the first resilient supporting member.

An oscillation system including two oscillators and two resilient supporting members such as mentioned above has two resonance frequencies around a torsional axis.

On the other hand, the resonance frequency has dispersion due to manufacturing error of the oscillator.

For such oscillator device, adjustment of the inertia moment of the oscillator may be carried out in accordance with the method to be described below, to adjust the two resonance frequencies.

First of all, the oscillator device is driven and the two resonance frequencies are detected.

An example of a method of detecting the resonance frequency is that: the frequency of an alternating magnetic field to be applied to a magnetic coil is swept and, by using driving waveform detecting means (not shown), the amplitude of oscillation in the torsional direction of the oscillator device is detected; and two frequencies of the alternating magnetic field where the amplitude comes to a peak are chosen as the two resonance frequencies.

From the difference of the frequency of the natural oscillation mode measured by using such measuring means and the adjustment target value, the inertia moment adjusting amount is calculated.

Based on the thus calculated inertia moment adjusting amount, a portion of the mass of the oscillator is removed or, alternatively, a mass is added to the oscillation, by which the two resonance frequencies can be adjusted.

In that occasion, if the mass removal and mass addition are done in combination to adjust the resonance frequency, the mass adjustment is easy to do and, therefore, the resonance frequency of the oscillator prior to the adjustment can be tuned to a target frequency very easily.

If on the other hand the adjustment process is performed only by either the mass removal or mass addition, although the procedure can be simplified, unless the resonance frequency before the adjustment is present within a certain frequency range, it is very difficult to adjust the same to a predetermined resonance frequency.

As a result of careful investigations made by the inventors of the subject application, it has been found that two resonance frequencies can easily be adjusted into an adjustable range once a parameter or parameters for determining the resonance frequency of the oscillator is taken into account in the following manner.

More specifically, for manufacture of an oscillator device which comprises a fixed member, first and second oscillators supported for oscillatory motion around a torsional axis by first and second torsion springs, the two oscillators being driven by first and second driving resonance frequencies gf1 and gf2, the procedure may comprise:

a first step for processing the two oscillators, wherein, when the two oscillators are going to be processed as oscillators having first and second resonance frequencies different from the two driving resonance frequencies with a certain dispersion range, the two oscillators are so processed that the first and second resonance frequencies different from the two driving resonance frequencies become equal to first and second resonance frequencies f1 and f2, respectively, which are included in adjustable resonance frequency ranges, respectively; and a second step for adjusting the first and second resonance frequencies f1 and f2 so that they become equal to the first and second driving resonance frequencies gf1 and gf2, respectively.

The inconveniences described hereinbefore can be removed by this procedure.

In the present invention, the driving resonance frequencies gf1 and gf2 refer to the resonance frequencies as an oscillator device which is a finished product is driven (thus, these may be called "final target resonance frequencies").

The design and process should desirably be done so that the aforementioned driving resonance frequencies gf1 and gf2 and the aforementioned resonance frequencies f1 and f2 satisfy the following relationship.

The driving resonance frequencies gf1 and gf2 are predetermined driving resonance frequencies (design values), and these values can be determined in accordance with the specification of the oscillator (e.g., scanner) as a finished product.

The resonance frequencies f1 and f2 may have certain dispersions based on the relationship such as the precision of a substrate of the oscillator device and the finishing precision, for example.

There may be a relationship that gf1 and gf2 have values larger than the maximum, at the upper limit side, of the dispersion ranges of f1 and f2 or, alternatively, these may be smaller than the minimum at the lower limit side of the dispersion ranges.

With the provision of a processing step which accomplishes the relationship described above, the first and second resonance frequencies f1 and f2 can be precisely tuned to the first and second driving resonance frequencies gf1 and gf2, respectively.

In order to satisfy the aforementioned relationship, the driving resonance frequencies (final target resonance frequencies: design values) as well as the dimensional precision of the substrate to be processed, material thereof and the finishing precision may preferably be determined beforehand based on experiments or the like, and target resonance frequencies tf1 and tf2 should be determined.

Here, the target resonance frequencies tf1 and tf2 are target values of the resonance frequencies for the process to be done at the first step, and these are resonance frequencies obtainable when the processing is made idealistically. This means that, if the substrate is processed based on a processing technique such as photolithography so as to obtain tf1 and tf2, normally an inevitable finishing error occurs.

Thus, in an exact sense, the resonance frequencies after the processing would have values (f1 and f2) deviated from tf1 and tf2.

In the present invention, the processing is done while taking into account such deviation (i.e., dispersion range) as well.

Those having been processed while aiming at tf1 and tf2 as target resonance frequencies will have resonance frequencies f1 and f2 (if the finishing precision is idealistic, f1 and f2 will be equal to tf1 and tf2, respectively), and f1 and f2 will satisfy the following ranges.

$$f1a < f1 < f1b$$

$$f2a < f2 < f2b$$

Hence, the dispersion range of f1 and f2 and will have the following relationship with gf1 and gf2.

$$gf1 < f1a, \text{ and } gf2 < f2a$$

Alternatively, $$gf1 > f1b, \text{ and } gf2 > f2b$$

With this procedure, two resonance frequencies which have dispersion resulting from a simplified step of adjustment based on either the mass removal or mass loading can be placed in an adjustable range in which the frequency can be easily tuned. This enables a larger yield.

In the present invention, when the first and second resonance frequencies f1 and f2 to be adjusted at the first step (which may be called a temporary resonance frequency relative to the final resonance frequency) are tuned to the driving resonance frequencies gf1 and gf2, idealistically these should be made exactly equal to gf1 and gf2, respectively.

However, in the present invention, it is not always necessary that these resonance frequencies are made exactly equal to the driving resonance frequencies.

Taking into consideration the current finishing precision, material dispersion and the specifications required for the finished product, preferably these should satisfy a range of not grater than ±1% of the target resonance frequency, more preferably, not greater than ±0.5%, and most preferably, not greater than ±0.1%.

If the value differs more than ±1%, where the oscillator device of the present invention is used as a scanner of a printer, for example, the overall magnification may change and a good image may not be obtainable any more.

Thus, in the present invention, matching the temporary resonance frequencies tf1 and tf2 with the target resonance frequencies gf1 and gf2 should be done in a range of not greater than ±1%, more preferably, not greater than ±0.5%, and most preferably, not greater than ±0.1%.

Now, several preferred embodiments of the present invention will be described with reference to a method of manufacturing an oscillator device having two, first and second oscillators supported by a fixed member for torsional oscillation about a torsional axis through two, first and second torsion springs, the two, first and second oscillators being driven at two, first and second resonance frequencies.

Embodiment 1

A first embodiment will be described with reference to a structural example of a method of manufacturing an oscillator device, comprising an adjustment step for removing a mass, to which the present invention is applied.

FIG. 1 is a front elevational view illustrating the structure of the oscillator device of the present embodiment.

As shown in FIG. 1, a first oscillator 101 is fixed to a fixed member 120 for torsional oscillation (swingably) through a first resilient supporting member (torsion spring) 111.

The first oscillator 101 and a second oscillator 102 are coupled together for torsional oscillation by a second resilient supporting member 112.

The material of these structural members is silicon, and these can be produced by silicon micromachining.

An oscillation system including two oscillators and two resilient supporting members has two frequencies of natural oscillation mode. Generally, the resonance frequencies f1 and f2 thereof are presented by the following equations.

$$f1 = \sqrt{\frac{I2\,k1 + I1\,k2 + I2\,k2 - \sqrt{-4\,I1\,I2\,k1\,k2 + (I1\,k2 + I2(k1+k2))^2}}{8\,I1\,I2\,\pi^2}}$$

$$f2 = \sqrt{\frac{I2\,k1 + I1\,k2 + I2\,k2 + \sqrt{-4\,I1\,I2\,k1\,k2 + (I1\,k2 + I2(k1+k2))^2}}{8\,I1\,I2\,\pi^2}}$$

wherein k1 and k2 denote the torsion spring constants of the first resilient supporting member 111 and the second resilient supporting member 112 around the torsional axis A, and I1 and I2 denote the inertia moments of the first oscillator 101 and the second oscillator 102 around the torsional axis A.

Furthermore, there is a permanent magnet 104 mounted on the oscillator 101. The permanent magnet 104 is polarized in the longitudinal direction as viewed in the drawing.

Then, by applying an alternating magnetic field with use of a magnetic coil (not shown), a torque can be produced.

By setting the frequency of the alternating magnetic field near the resonance frequencies f1 and f2, oscillation based on the resonance phenomenon can be produced.

On the other hand, due to the manufacturing error at the first step for manufacturing the oscillator device, the spring constant k1 of the first resilient supporting member and the spring constant k2 of the second resilient supporting member have an error. As a result, the two resonance frequencies f1 and f2 have dispersion.

For example, if a first resonance frequency of the two resonance frequencies is denoted by f1 while a second resonance frequency thereof is denoted by f2, the minimums at the lower limit side of the dispersion ranges of the resonance frequencies f1 and f2 are denoted by f1a and f2a, respectively, and the maximums at the upper limit side of the dispersion ranges of f1 and f2 are denoted by f1b and f2b, respectively, then the first and second resonance frequencies f1 and f2 are dispersed in the following ranges:

$$f1a < f1 < f1b$$

$$f2a < f2 < f2b$$

In this embodiment, when the two resonance frequencies f1 and f2 have such dispersion ranges, at the second step these are tuned to the first and second target resonance frequencies gf1 and gf2, respectively. This procedure includes an adjusting process of removing a mass by irradiating a laser beam to a mass removal area 105 in a portion of the oscillator.

In order to assure that the frequencies can be adjusted to the first and second driving resonance frequencies gf1 and gf2 at the second step, as will be described below, at the first step for making the oscillator device, the oscillator device should be made so that the two resonance frequencies having dispersion are put in an adjustable range.

In the first step, if the first and second spring constants of the first and second torsion springs are denoted by k1 and k2, the minimums at the lower limit side of the first and second spring constant are denoted by k1a and k2a, and the maximums at upper limit side of them are denoted by k1b and k2b, and when the first and second torsion springs are made in the following range of spring constants:

$$k1a < k1 < k1b$$

$$k2a < k2 < k2b,$$

the first and second target resonance frequencies can be calculated using the following parameters.

More specifically, the oscillator device may be made at the first step so that the first and second resonance frequencies f1 and f2 of all the oscillators which are produced individually are put in the resonance frequency ranges which satisfy equation (1) to equation (4) to be mentioned below.

If this is done, then all oscillator devices can be adjust to a predetermined frequency, and increased yield can be accomplished.

$$f2 \geq \frac{1}{2\pi}\sqrt{\frac{k1b}{I1}\left(1 + \frac{k2a}{k1b - 4f1^2 I1 \pi^2}\right)} \quad (1)$$

wherein $$I1 = \frac{gf1^2 k1b\,k2a + gf2^2 k1b\,k2a + \sqrt{k1b\,k2a^2(gf1^4 k1b + gf2^4 k1b - 2gf1^2 gf2^2(k1b + 2k2a))}}{8\,gf1^2 gf2^2 k2a \pi^2}$$

$$f2 \leq \frac{1}{2\pi}\sqrt{-\frac{k1a\,k2b(k2b - 4f1^2 I2\pi^2)}{I2(-k1a\,k2b + 4f1^2 I2(k1a + k2b)\pi^2)}} \quad (2)$$

wherein $$I2 = \frac{gf1^2 k1a\,k2b + gf2^2 k1a\,k2b - \sqrt{k1a\,k2b^2(gf1^4 k1a + gf2^4 k1a - 2gf1^2 gf2^2(k1a + 2k2b))}}{8\,gf1^2 gf2^2 (k1a + k2b)\pi^2}$$

$$f1 < gf1 \quad (3)$$

$$f2 < gf2 \quad (4)$$

Here, in this embodiment, the following values are taken.
gf1: 2362 Hz
gf2: 4724 Hz
k1a: 0.00202*0.98N/m
k1b: 0.00202*1.02N/m
k2a: 0.00106*0.97N/m
k2a: 0.00106*1.03N/m These parameters are not limited to the values mentioned above, and any other values may be used.

Furthermore, although in the present embodiment the driving resonance frequencies gf1 and gf2 are set to certain values, certain ranges may be set in place of it.

In that occasion, within the expected ranges of gf1 and gf2, those having a target frequency most apart from gf1 or gf2 may preferably be chosen as the target frequency. However, the target frequency may be calculated using the center of the range of gf1 and gf2.

Furthermore, in this embodiment, the minimums at the lower limit side of the first and second spring constants are chosen as the parameters k1a and k2a, while the maximums at the upper limit side of them are chosen as the parameters k1b and k2b.

However, those values larger than the minimums at the lower limit side may be chosen as k1a and k2a, and those values smaller than the maximums at the upper limit side may be chosen as k1b and k2b.

Preferably, the dispersion of the spring constants may be statistically evaluated based on experiments to be made beforehand, and the range of dispersion may be specified based on the standard deviation.

In that occasion, some oscillators may become non-adjustable. However, since the adjustment amount in most adjustable oscillator devices can be smaller, the process time of the second step will be shortened.

Embodiment 2

A second embodiment will be described with reference to a structural example of an oscillator device manufacturing method according to the present invention, which includes an adjustment step of removing a mass in the manner different form the first embodiment. The structure of the oscillator device of the present embodiment is essentially the same as has been described with reference to the first embodiment.

Due to the manufacturing error, like the first embodiment, the spring constant k1 of the first resilient supporting member and the spring constant k2 of the second resilient supporting member have an error. As a result, the two resonance frequencies f1 and f2 have dispersions which are in the following ranges.

$$f1a < f1 < f1b$$

$$f2a < f2 < f2b$$

In this embodiment, when the two resonance frequencies f1 and f2 have such dispersion ranges, like the first embodiment, at the second step these are tuned to the first and second target resonance frequencies gf1 and gf2, respectively.

This procedure includes an adjusting process of removing a mass by irradiating a laser beam to a portion of the oscillator, in this embodiment.

In order to assure that the frequencies can be adjusted to the first and second driving resonance frequencies gf1 and gf2 at the second step, as will be described below, at the first step for making the oscillator device, the oscillator device should be made so that the two resonance frequencies having dispersion are put in an adjustable range.

In the first step, like the first embodiment, the first and second torsion springs are made in the following range of spring constants:

$$k1a < k1 < k1b$$

$$k2a < k2 < k2b$$

Here, if the center of the aforementioned range of the spring constant k1 is at k1c while the center of the aforementioned range of the spring constant k2 is at k2c, and where at the first step the production target resonance frequencies are denoted by tf1 and tf2, tf1 may be calculated from equation (5) below and tf2 may be calculated from equation (6) below.

Figure 2:
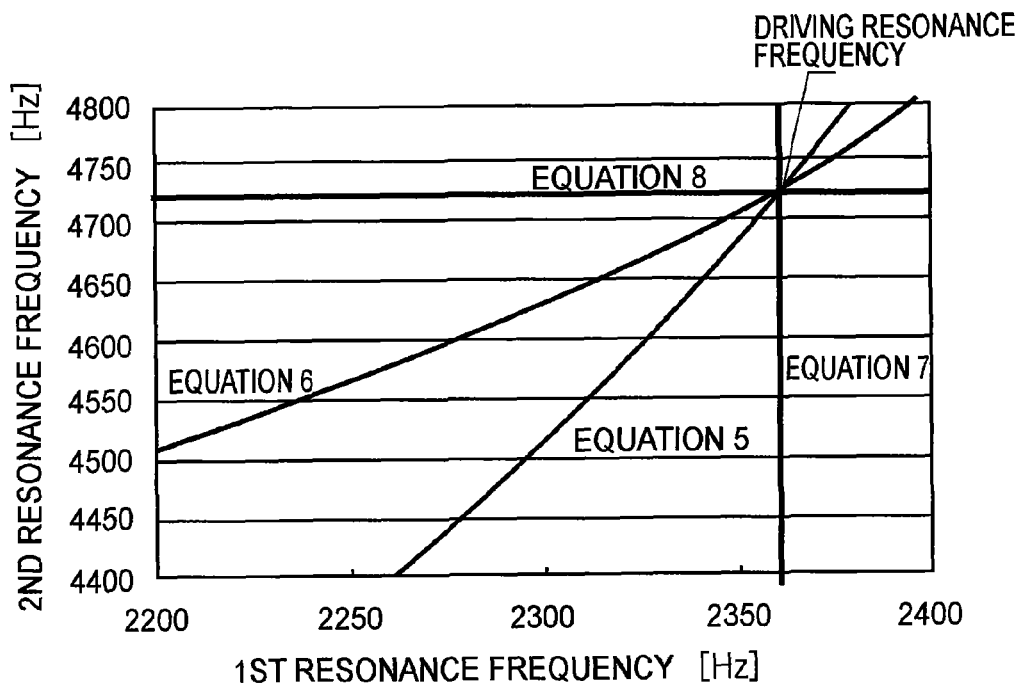
FIG. 2 is a graph illustrating an adjustable range in which the frequency is adjustable through a frequency adjusting step based on the removal, according to second and third embodiments of the present invention.
Figure 3:
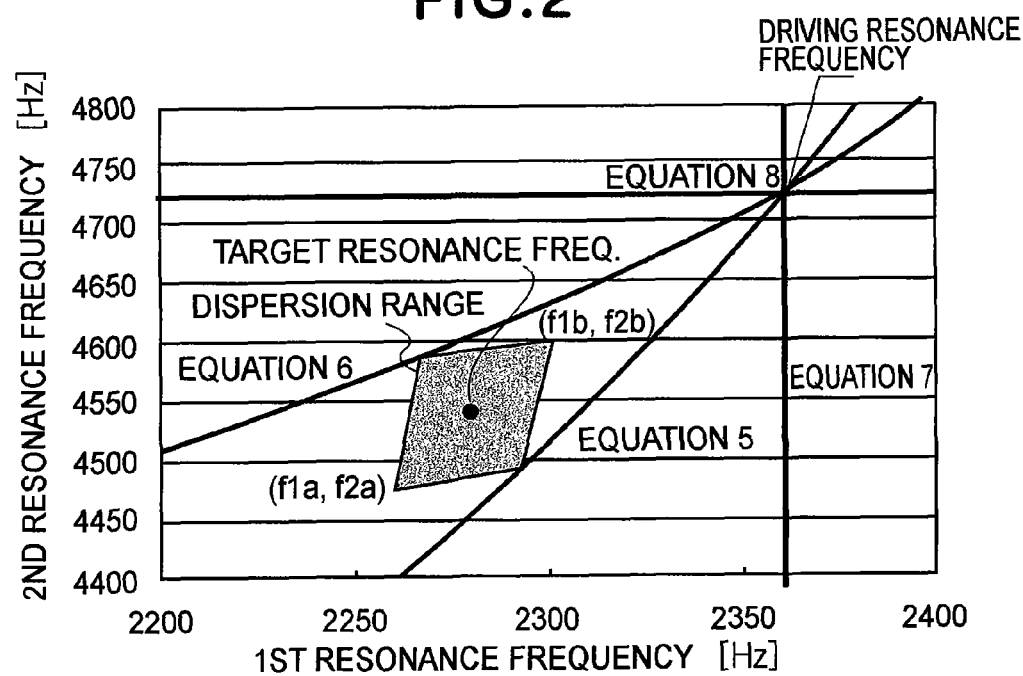
FIG. 3 is a graph for explaining a structural example wherein the best target frequency is set in the second embodiment of the present invention.

Then, by using these calculated target resonance frequencies, as shown in FIG. 2 and FIG. 3, the dispersion of the resonance frequencies before the adjustment comes into the adjustable range, and thus all oscillator devices can be adjusted to the predetermined resonance frequencies. Therefore, an increased yield can be accomplished.

$$tf1 = \sqrt{\frac{I2\,k1c + I1\,k2c + I2\,k2c - \sqrt{-4\,I1\,I2\,k1c\,k2c + (I1\,k2c + I2(k1c + k2c))^2}}{8\,I1\,I2\pi^2}} \quad (5)$$

wherein $$I1 = \frac{gf1^2 k1b\,k2a + gf2^2 k1b\,k2a + \sqrt{k1b\,k2a^2(gf1^4 k1b + gf2^4 k1b - 2\,gf1^2\,gf2^2(k1b + 2k2a))}}{8\,gf1^2 gf2^2 k2a\pi^2}$$

$$I2 = \frac{gf1^2 k1b\,k2a + gf2^2 k1b\,k2a - \sqrt{k1b\,k2a^2(gf1^4 k1b + gf2^4 k1b - 2\,gf1^2\,gf2^2(k1b + 2k2a))}}{8\,gf1^2 gf2^2 (k1b + k2a)\pi^2}$$

$$tf2 = \sqrt{\frac{I2\,k1c + I1\,k2c + I2\,k2c + \sqrt{-4\,I1\,I2\,k1c\,k2c + (I1\,k2c + I2(k1c + k2c))^2}}{8\,I1\,I2\pi^2}} \quad (6)$$

wherein $$I1 = \frac{gf1^2 k1a\,k2b + gf2^2 k1a\,k2b + \sqrt{k1a\,k2b^2(gf1^4 k1a + gf2^4 k1a - 2\,gf1^2\,gf2^2(k1a + 2k2b))}}{8\,gf1^2 gf2^2 k2b\pi^2}$$

$$I2 = \frac{gf1^2 k1a\,k2b + gf2^2 k1a\,k2b - \sqrt{k1a\,k2b^2(gf1^4 k1a + gf2^4 k1a - 2\,gf1^2\,gf2^2(k1a + 2k2b))}}{8\,gf1^2 gf2^2 (k1a + k2b)\pi^2}$$

The target frequencies calculated in the present embodiment are values with which all the oscillators can be adjusted and with which the adjustment amount becomes smallest.

With the present embodiment, not only the yield can be improved but also the adjustment speed can be increased.

Specifically, the target frequency can be used in the design mask patterns for the silicon micromachining.

Here, in this embodiment, the following values are taken.
gf1: 2362 Hz
gf2: 4724 Hz
k1c: 0.00202N/m
k2c: 0.00106N/m
k1a: 0.00202*0.98N/m
k1b: 0.00202*1.02N/m
k2a: 0.00106*0.97N/m
k2a: 0.00106*1.03N/m The target frequency of the first oscillator in this case is 2273.45 Hz, and the target frequency of the second oscillator is 4525.68 Hz.

These parameters are not limited to the values mentioned above, and any other values may be used.

Furthermore, although in the present embodiment the driving resonance frequencies gf1 and gf2 are set to certain values, certain ranges may be set in place of it.

In that occasion, within the expected ranges of gf1 and gf2, those having a target frequency most apart from gf1 or gf2 may preferably be chosen as the target frequency. However, the target frequency may be calculated using the center of the range of gf1 and gf2.

Furthermore, in this embodiment, the minimums at the lower limit side of the first and second spring constants are chosen as the parameters k1a and k2a, while the maximums at the upper limit side of them are chosen as the parameters k1b and k2b.

However, those values larger than the minimums at the lower limit side may be chosen as k1a and k2a, and those values smaller than the maximums at the upper limit side may be chosen as k1b and k2b.

Preferably, the dispersion of the spring constants may be statistically evaluated based on experiments to be made beforehand, and the range of dispersion may be specified based on the standard deviation.

In that occasion, some oscillators having dispersion beyond the range specified by the standard deviation may become non-adjustable. However, since the adjustment amount in most adjustable oscillator devices can be smaller, the process time of the second step will be shortened.

Embodiment 3

A third embodiment will be described with reference to a structural example of an oscillator device manufacturing method according to the present invention, which includes an adjustment step of removing a mass in the manner different form the first and second embodiments.

The structure of the oscillator device of the present embodiment is essentially the same as has been described with reference to the first embodiment.

Due to the manufacturing error, like the first embodiment, the spring constant k1 of the first resilient supporting member and the spring constant k2 of the second resilient supporting member have an error. As a result, the two resonance frequencies f1 and f2 have dispersions which are in the following ranges.

$$f1a < f1 < f1b$$

$$f2a < f2 < f2b$$

In this embodiment, when the two resonance frequencies f1 and f2 have such dispersion ranges, like the first embodiment, at the second step these are tuned to the first and second target resonance frequencies gf1 and gf2, respectively.

This procedure includes an adjusting process of removing a mass by irradiating a laser beam to a mass removal area 105 in a portion of the oscillator.

Next, in the second step, in order to assure that the frequency is tuned to a predetermined resonance frequency regardless that there is an error in the inertia moment of the first oscillator and second oscillator, in addition to the error of the spring constant mentioned hereinbefore, the optimum production target frequencies tf1 and tf2 in the first step may be calculated from the parameters for determining the resonance frequencies of the oscillator, as will be explained below.

At the first step, like the first embodiment, the first and the second torsion springs are made in the following range of spring constants:

$$k1a < k1 < k1b$$

$$k2a < k2 < k2b$$

If the inertia moments of the first and second oscillators under the aforementioned target resonance frequencies gf1 and gf2 are denoted by I1 and I2, respectively, and the minimums at the lower limit side of the first and the second inertia moments are denoted by I1−I1e and I2−I2e, respectively, while the maximums of them at the upper limit side are denoted by I1+I1e and I2+I2e, respectively, the first and second oscillators may be made in the following range of inertia moment:

$$I1 - I1e < I1 < I1 + I1e$$

$$I2 - I2e < I2 < I2 + I2e$$

Where the center of the aforementioned range of spring constant k1 is at k1c, and the center of the aforementioned range of spring constant k2 is at k2c, in the first step, if the production target resonance frequencies are denoted by tf1 and tf2, then tf1 may be calculated from equation (7) below and tf2 may be calculated from equation (8) below.

Then, by using these calculated target resonance frequencies, the dispersion of the resonance frequencies before the adjustment comes into the adjustable range, and thus all oscillator devices can be adjusted to the predetermined resonance frequencies. Therefore, an increased yield can be accomplished.

$$tf1 = \sqrt{\frac{I2\,k1c + I1\,k2c + I2\,k2c - \sqrt{-4\,I1\,I2\,k1c\,k2c + (I1\,k2c + I2(k1c + k2c))^2}}{8\,I1\,I2\pi^2}} \quad (7)$$

wherein $$I1 = \frac{gf1^2 k1b\,k2a + gf2^2 k1b\,k2a + \sqrt{k1b\,k2a^2(gf1^4 k1b + gf2^4 k1b - 2\,gf1^2\,gf2^2(k1b + 2k2a))}}{8\,gf1^2 gf2^2 k2a\pi^2} + I1e$$

$$I2 = \frac{gf1^2 k1b\,k2a + gf2^2 k1b\,k2a - \sqrt{k1b\,k2a^2(gf1^4 k1b + gf2^4 k1b - 2\,gf1^2\,gf2^2(k1b + 2k2a))}}{8\,gf1^2 gf2^2 (k1b + k2a)\pi^2} + I2e$$

$$tf2 = \sqrt{\frac{I2\,k1c + I1\,k2c + I2\,k2c + \sqrt{-4\,I1\,I2\,k1c\,k2c + (I1\,k2c + I2(k1c + k2c))^2}}{8\,I1\,I2\pi^2}} \quad (8)$$

wherein $$I1 = \frac{gf1^2 k1a\,k2b + gf2^2 k1a\,k2b + \sqrt{k1a\,k2b^2(gf1^4 k1a + gf2^4 k1a - 2\,gf1^2\,gf2^2(k1a + 2k2b))}}{8\,gf1^2 gf2^2 k2b\pi^2} + I1e$$

$$I2 = \frac{gf1^2 k1a\,k2b + gf2^2 k1a\,k2b - \sqrt{k1a\,k2b^2(gf1^4 k1a + gf2^4 k1a - 2\,gf1^2\,gf2^2(k1a + 2k2b))}}{8\,gf1^2 gf2^2 (k1a + k2b)\pi^2} + I2e$$

The target frequencies calculated in the present embodiment are values with which all the oscillators can be adjusted and with which the adjustment amount becomes smallest.

With the present embodiment, not only the yield can be improved but also the adjustment speed can be increased.

Specifically, the target frequency can be used in the design mask patterns for the silicon micromachining.

Here, in this embodiment, the following values are taken.
gf1: 2362 Hz
gf2: 4724 Hz k1c: 0.00202N/m
k2c: 0.00106N/m
k1a: 0.00202*0.98N/m
k1b: 0.00202*1.02N/m
k2a: 0.00106*0.97N/m
k2a: 0.00106*1.03N/m
I1e=64.1*10$^{14}$ kg/m$^2$
I1e=5.7*10$^{14}$ kg/m$^2$ The target frequency of the first oscillator in this case is tf1=2273.45 Hz, and the target frequency of the second oscillator is tf2=4525.68 Hz.

These parameters are not limited to the values mentioned above, and any other values may be used.

Furthermore, although in the present embodiment the driving resonance frequencies gf1 and gf2 are set to certain values, certain ranges may be set in place of it.

In that occasion, within the expected ranges of gf1 and gf2, those having a target frequency most apart from gf1 or gf2 may preferably be chosen as the target frequency. However, the target frequency may be calculated using the center of the range of gf1 and gf2.

Furthermore, in this embodiment, the minimums at the lower limit side of the first and second inertia moments are chosen as the parameters I1−I1e and I2−I2e, while the maximums at the upper limit side of them are chosen as the parameters I1+I1e and I2+I2e.

However, those values larger than the minimums at the lower limit side may be chosen as I1−I1e and I2−I2e, and those values smaller than the maximums at the upper limit side may be chosen as I1+I1e and I2+I2e.

Preferably, the dispersion of the inertia moments may be statistically evaluated based on experiments to be made beforehand, and the range of dispersion may be determined based on the standard deviation.

In that occasion, some oscillators will become non-adjustable. However, since the adjustment amount in most adjustable oscillator devices can be smaller, the process time of the second step will be shortened.

Embodiment 4

A fourth embodiment will be described with reference to a structural example of a method of manufacturing an oscillator device, comprising an adjustment step for adding a mass, to which the present invention is applied.

Figure 4:
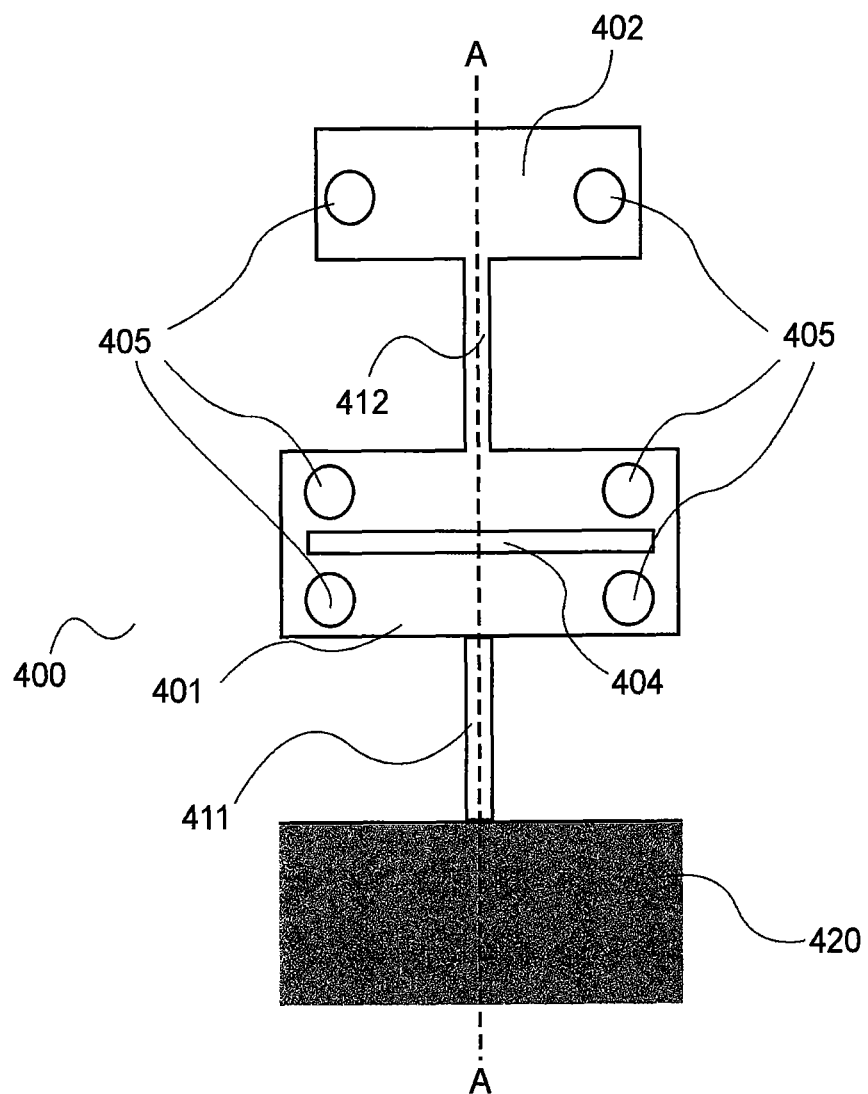
FIG. 4 is a diagram for explaining a structural example of an oscillator device according to a fourth embodiment of the present invention.

FIG. 4 is a front elevational view illustrating the structure of the oscillator device of the present embodiment.

As shown in FIG. 4, a first oscillator 401 is fixed to a fixed member 420 for torsional oscillation (swingably) through a first resilient supporting member (torsion spring) 411.

The first oscillator 401 and a second oscillator 402 are coupled together for torsional oscillation by a second resilient supporting member 412.

The material of these structural members is silicon, and these can be produced by silicon micromachining.

An oscillation system including two oscillators and two resilient supporting members has two frequencies of natural oscillation mode. Generally, the resonance frequencies f1 and f2 thereof are presented by the following equations.

$$f1 = \sqrt{\frac{I2k1 + I1k2 + I2k2 - \sqrt{-4I1\,I2k1k2 + (I1k2 + I2(k1+k2))^2}}{8\,I1\,I2\pi^2}}$$

$$f2 = \sqrt{\frac{I2k1 + I1k2 + I2k2 + \sqrt{-4I1\,I2k1k2 + (I1k2 + I2(k1+k2))^2}}{8\,I1\,I2\pi^2}}$$

wherein k1 and k2 denote the torsion spring constants of the first resilient supporting member 111 and the second resilient supporting member 112 around the torsional axis A, and I1 and I2 denote the inertia moments of the first oscillator 101 and the second oscillator 102 around the torsional axis A.

Furthermore, there is a permanent magnet 404 mounted on the oscillator 401. The permanent magnet 404 is polarized in the longitudinal direction as viewed in the drawing.

Then, by applying an alternating magnetic field with use of a magnetic coil (not shown), a torque can be produced.

By setting the frequency of the alternating magnetic field near the resonance frequencies f1 and f2, oscillation based on the resonance phenomenon can be produced.

On the other hand, due to the manufacturing error at the first step for manufacturing the oscillator device, the spring constant k1 of the first resilient supporting member and the spring constant k2 of the second resilient supporting member have an error. As a result, the two resonance frequencies f1 and f2 have dispersion.

For example, if a first resonance frequency of the two resonance frequencies is denoted by f1 while a second resonance frequency thereof is denoted by f2, the minimums at the lower limit side of the dispersion ranges of the resonance frequencies f1 and f2 are denoted by f1a and f2a, respectively, and the maximums at the upper limit side of the dispersion ranges of f1 and f2 are denoted by f1b and f2b, respectively, then the first and second resonance frequencies f1 and f2 are dispersed in the following ranges:

f1a<f1<f1b f2a<f2<f2b

In this embodiment, when the two resonance frequencies f1 and f2 have such dispersion ranges, at the second step these are tuned to the first and second target resonance frequencies gf1 and gf2, respectively.

This procedure includes an adjusting process of adding a mass by applying a resin to a mass adding area 405 in a portion of the oscillator.

In order to assure that the frequencies can be adjusted to the first and second driving resonance frequencies gf1 and gf2 at the second step, as will be described below, at the first step for making the oscillator device, the oscillator device should be made so that the two resonance frequencies having dispersion are put in an adjustable range.

In the first step, if the first and second spring constants of the first and second torsion springs are denoted by k1 and k2, the minimums at the lower limit side of the first and second spring constant are denoted by k1a and k2a, and the maximums at upper limit side of them are denoted by k1b and k2b, and when the first and second torsion springs are made in the following range of spring constants:

k1a<k1<k1b k2a<k2<k2b, the first and second target resonance frequencies can be calculated using the following parameters.

More specifically, the oscillator device may be made at the first step so that the first and second resonance frequencies f1 and f2 of all the oscillators which are produced individually are put in the resonance frequency ranges which satisfy equation (9) to equation (12) to be mentioned below.

Figure 5:
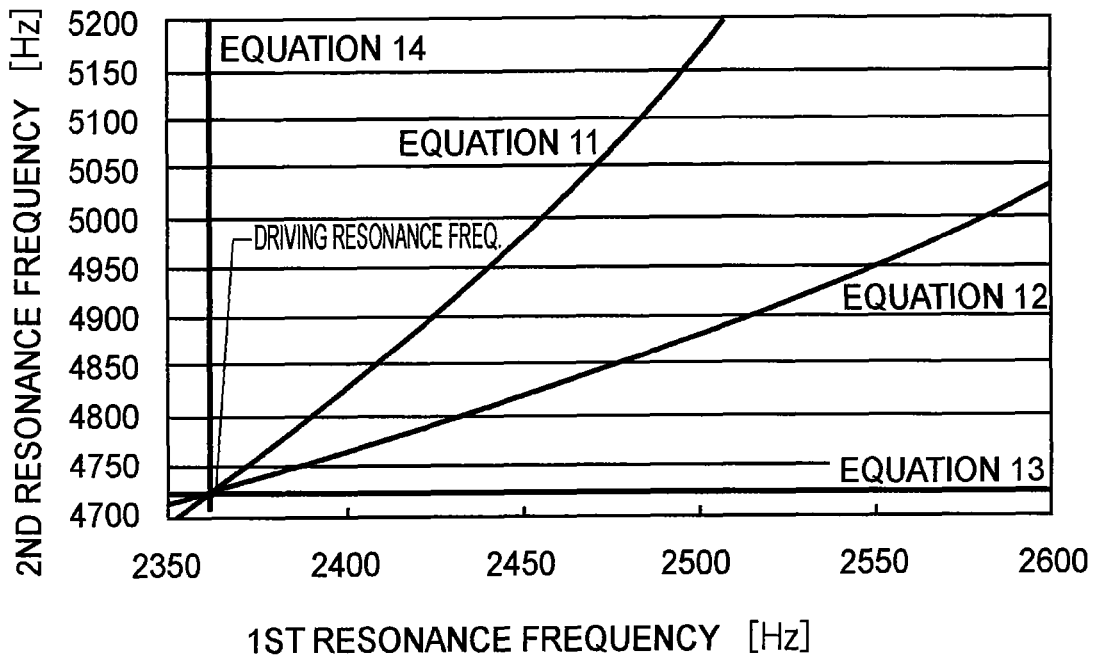
FIG. 5 is a graph illustrating an adjustable range in which the frequency is adjustable through a frequency adjusting step based on the addition, according to fourth and fifth embodiments of the present invention.

If this is done, then as shown in FIG. 5 all oscillator devices can be adjust to a predetermined frequency, and increased yield can be accomplished.

$$f2 \le \frac{1}{2\pi}\sqrt{\frac{k1a}{I1}\left(1+\frac{k2b}{k1a-4f1^2 I1\pi^2}\right)} \quad (9)$$

wherein $$I1 = \frac{gf1^2 k1a\,k2b + gf2^2 k1a\,k2b + \sqrt{k1a\,k2b^2(gf1^4 k1a + gf2^4 k1a - 2gf1^2 gf2^2(k1a+2k2b))}}{8\,gf1^2 gf2^2 k2b\pi^2}$$

$$f2 \ge \frac{1}{2\pi}\sqrt{-\frac{k1b\,k2a(k2a-4f1^2 I2\pi^2)}{I2(-k1b\,k2a+4f1^2 I2(k1b+k2a)\pi^2)}} \quad (10)$$

wherein $$I2 = \frac{gf1^2 k1b\,k2a + gf2^2 k1b\,k2a - \sqrt{k1b\,k2a^2(gf1^4 k1b + gf2^4 k1b - 2gf1^2 gf2^2(k1b+2k2a))}}{8\,gf1^2 gf2^2(k1b+k2a)\pi^2}$$

$$f1 > gf1 \quad (11)$$

$$f2 > gf2 \quad (12)$$

Here, in this embodiment, the following values are taken.
gf1: 2362 Hz
gf2: 4724 Hz
k1a: 0.00202*0.98N/m
k1b: 0.00202*1.02N/m
k2a: 0.00106*0.97N/m
k2a: 0.00106*1.03N/m These parameters are not limited to the values mentioned above, and any other values may be used.

Furthermore, although in the present embodiment the driving resonance frequencies gf1 and gf2 are set to certain values, certain ranges may be set in place of it.

In that occasion, within the expected ranges of gf1 and gf2, those having a target frequency most apart from gf1 or gf2 may preferably be chosen as the target frequency. However, the target frequency may be calculated using the center of the range of gf1 and gf2.

Furthermore, in this embodiment, the minimums at the lower limit side of the first and second spring constants are chosen as the parameters k1a and k2a, while the maximums at the upper limit side of them are chosen as the parameters k1b and k2b.

However, those values larger than the minimums at the lower limit side may be chosen as k1a and k2a, and those values smaller than the maximums at the upper limit side may be chosen as k1b and k2b.

Preferably, the dispersion of the spring constants may be statistically evaluated based on experiments to be made beforehand, and the range of dispersion may be specified based on the standard deviation.

In that occasion, some oscillators may become non-adjustable. However, since the adjustment amount in most adjustable oscillator devices can be smaller, the process time of the second step will be shortened.

Embodiment 5

A fifth embodiment will be described with reference to a structural example of an oscillator device manufacturing method according to the present invention, which includes an adjustment step of adding a mass in the manner different form the forth embodiment. The structure of the oscillator device of the present embodiment is essentially the same as has been described with reference to the fourth embodiment.

Due to the manufacturing error, like the fourth embodiment, the spring constant k1 of the first resilient supporting member and the spring constant k2 of the second resilient supporting member have an error. As a result, the two resonance frequencies f1 and f2 have dispersions which are in the following ranges.

$$f1a < f1 < f1b$$

$$f2a < f2 < f2b$$

In this embodiment, when the two resonance frequencies f1 and f2 have such dispersion ranges, like the fourth embodiment, at the second step these are tuned to the first and second target resonance frequencies gf1 and gf2, respectively.

This procedure includes an adjusting process of adding a mass by applying a resin to a mass adding area 405 in a portion of the oscillator, in this embodiment.

In order to assure that the frequencies can be adjusted to the first and second driving resonance frequencies gf1 and gf2 at the second step, as will be described below, at the first step for making the oscillator device, the oscillator device should be made so that the two resonance frequencies having dispersion are put in an adjustable range.

In the first step, like the fourth embodiment, the first and second torsion springs are made in the following range of spring constants:

$$k1a < k1 < k1b$$

$$k2a < k2 < k2b$$

Here, if the center of the aforementioned range of the spring constant k1 is at k1c while the center of the aforementioned range of the spring constant k2 is at k2c, and where at the first step the production target resonance frequencies are denoted by tf1 and tf2, tf1 may be calculated from equation (13) below and tf2 may be calculated from equation (14) below.

Figure 6:
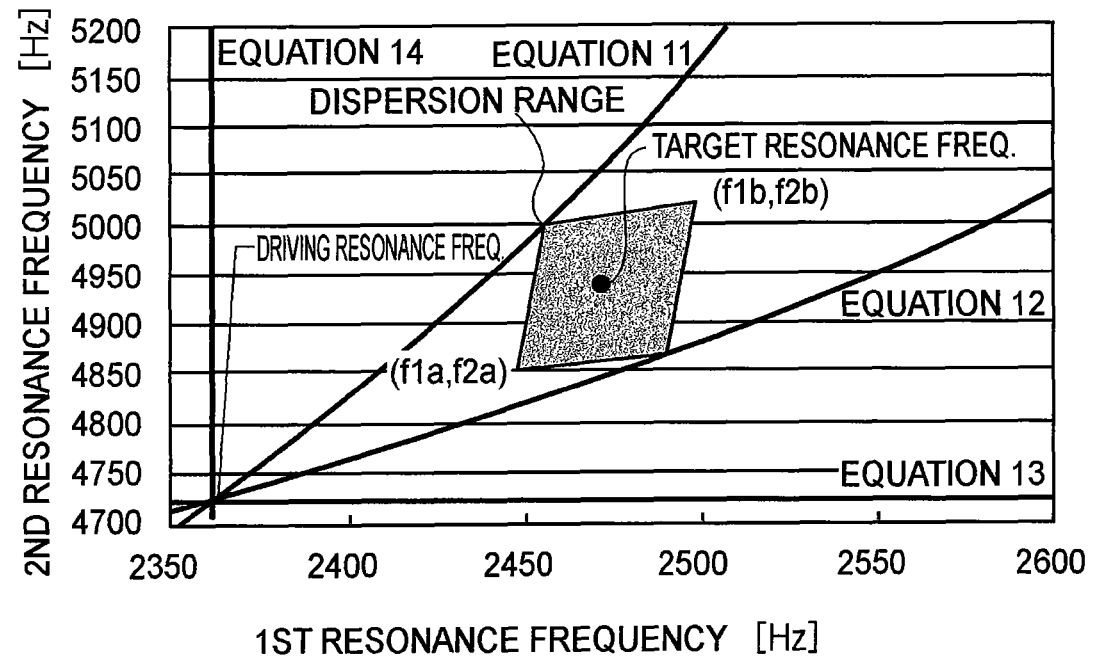
FIG. 6 is a graph for explaining a structural example wherein the best target frequency is set in the fifth embodiment of the present invention.

Then, by using these calculated target resonance frequencies, as shown in FIG. 6, the dispersion of the resonance frequencies before the adjustment comes into the adjustable range, and thus all oscillator devices can be adjusted to the predetermined resonance frequencies. Therefore, an increased yield can be accomplished.

$$tf1 = \sqrt{\frac{I2\,k1c + I1\,k2c + I2\,k2c - \sqrt{-4\,I1\,I2\,k1c\,k2c + (I1\,k2c + I2(k1c+k2c))^2}}{8\,I1\,I2\pi^2}} \quad (13)$$

wherein $$I1 = \frac{gf1^2 k1a\,k2b + gf2^2 k1a\,k2b + \sqrt{k1a\,k2b^2(gf1^4 k1a + gf2^4 k1a - 2gf1^2 gf2^2(k1a+2k2b))}}{8\,gf1^2 gf2^2 k2b\pi^2}$$

$$I2 = \frac{gf1^2 k1a\,k2b + gf2^2 k1a\,k2b - \sqrt{k1a\,k2b^2(gf1^4 k1a + gf2^4 k1a - 2gf1^2 gf2^2(k1a+2k2b))}}{8\,gf1^2 gf2^2(k1a+k2b)\pi^2}$$

-continued $$tf2 = \sqrt{\frac{I2\,k1c + I1\,k2c + I2\,k2c + \sqrt{-4\,I1\,I2\,k1c\,k2c + (I1\,k2c + I2(k1c + k2c))^2}}{8\,I1\,I2\pi^2}} \quad (14)$$

wherein $$I1 = \frac{gf1^2 k1b\,k2a + gf2^2 k1b\,k2a + \sqrt{k1b\,k2a^2(gf1^4 k1b + gf2^4 k1b - 2\,gf1^2\,gf2^2(k1b + 2\,k2a))}}{8\,gf1^2 gf2^2 k2a\pi^2}$$

$$I2 = \frac{gf1^2 k1b\,k2a + gf2^2 k1b\,k2a - \sqrt{k1b\,k2a^2(gf1^4 k1b + gf2^4 k1b - 2\,gf1^2\,gf2^2(k1b + 2\,k2a))}}{8\,gf1^2 gf2^2 (k1b + k2a)\pi^2}$$

The target frequencies calculated in the present embodiment are values with which all the oscillators can be adjusted and with which the adjustment amount becomes smallest.

With the present embodiment, not only the yield can be improved but also the adjustment speed can be increased.

Specifically, the target frequency can be used in the design mask patterns for the silicon micromachining.

Here, in this embodiment, the following values are taken.
gf1: 2362 Hz
gf2: 4724 Hz
k1a: 0.00202*0.98N/m
k1b: 0.00202*1.02N/m
k2a: 0.00106*0.97N/m
k2a: 0.00106*1.03N/m These parameters are not limited to the values mentioned above, and any other values may be used.

Furthermore, although in the present embodiment the driving resonance frequencies gf1 and gf2 are set to certain values, certain ranges may be set in place of it.

In that occasion, within the expected ranges of gf1 and gf2, those having a target frequency most apart from gf1 or gf2 may preferably be chosen as the target frequency. However, the target frequency may be calculated using the center of the range of gf1 and gf2.

Furthermore, in this embodiment, the minimums at the lower limit side of the first and second spring constants are chosen as the parameters k1a and k2a, while the maximums at the upper limit side of them are chosen as the parameters k1b and k2b.

However, those values larger than the minimums at the lower limit side may be chosen as k1a and k2a, and those values smaller than the maximums at the upper limit side may be chosen as k1b and k2b.

Preferably, the dispersion of the spring constants may be statistically evaluated based on experiments to be made beforehand, and the range of dispersion may be specified based on the standard deviation.

In that occasion, some oscillators having dispersion beyond the range specified by the standard deviation may become non-adjustable. However, since the adjustment amount in most adjustable oscillator devices can be smaller, the process time of the second step will be shortened.

Embodiment 6

A sixth embodiment will be described with reference to a structural example of an oscillator device manufacturing method according to the present invention, which includes an adjustment step of adding a mass in the manner different form the forth and fifth embodiments.

The structure of the oscillator device of the present embodiment is essentially the same as has been described with reference to the fourth embodiment.

Due to the manufacturing error, like the fourth embodiment, the spring constant k1 of the first resilient supporting member and the spring constant k2 of the second resilient supporting member have an error. As a result, the two resonance frequencies f1 and f2 have dispersions which are in the following ranges.

$$f1a < f1 < f1b$$

$$f2a < f2 < f2b$$

In this embodiment, when the two resonance frequencies f1 and f2 have such dispersion ranges, like the fourth embodiment, at the second step these are tuned to the first and second target resonance frequencies gf1 and gf2, respectively.

This procedure includes an adjusting process of removing a mass by irradiating a laser beam to a mass removal area 105 in a portion of the oscillator.

Next, in the second step, in order to assure that the frequency is tuned to a predetermined resonance frequency regardless that there is an error in the inertia moment of the first oscillator and second oscillator, in addition to the error of the spring constant mentioned hereinbefore, the optimum production target frequencies tf1 and tf2 in the first step may be calculated from the parameters for determining the resonance frequencies of the oscillator, as will be explained below.

At the first step, like the fourth embodiment, the first and the second torsion springs are made in the following range of spring constants:

$$k1a < k1 < k1b$$

$$k2a < k2 < k2b$$

If the inertia moments of the first and second oscillators under the aforementioned driving resonance frequencies gf1 and gf2 are denoted by I1 and I2, respectively, and the minimums at the lower limit side of the first and the second inertia moments are denoted by I1−I1e and I2−I2e, respectively, while the maximums of them at the upper limit side are denoted by I1+I1e and I2+I2e, respectively, the first and second oscillators may be made in the following range of inertia moment:

$$I1 - I1e < I1 < I1 + I1e$$

$$I2 - I2e < I2 < I2 + I2e$$

Where the center of the aforementioned range of spring constant k1 is at k1c, and the center of the aforementioned range of spring constant k2 is at k2c, in the first step, if the production target resonance frequencies are denoted by tf1 and tf2, then tf1 may be calculated from equation (15) below and tf2 may be calculated from equation (16) below.

Then, by using these calculated target resonance frequencies, the dispersion of the resonance frequencies before the adjustment comes into the adjustable range, and thus all oscillator devices can be adjusted to the predetermined resonance frequencies. Therefore, an increased yield can be accomplished.

$$tf1 = \sqrt{\frac{I2\,k1c + I1\,k2c + I2\,k2c - \sqrt{-4\,I1\,I2\,k1c\,k2c + (I1\,k2c + I2(k1c + k2c))^2}}{8\,I1\,I2\pi^2}} \quad (15)$$

wherein $$I1 = \frac{gf1^2 k1a\,k2b + gf2^2 k1a\,k2b + \sqrt{k1a\,k2b^2(gf1^4 k1a + gf2^4 k1a - 2\,gf1^2\,gf2^2(k1a + 2k2b))}}{8\,gf1^2 gf2^2 k2b\pi^2} - I1e$$

$$I2 = \frac{gf1^2 k1a\,k2b + gf2^2 k1a\,k2b - \sqrt{k1a\,k2b^2(gf1^4 k1a + gf2^4 k1a - 2\,gf1^2\,gf2^2(k1a + 2k2b))}}{8\,gf1^2 gf2^2 (k1a + k2b)\pi^2} - I2e$$

$$tf2 = \sqrt{\frac{I2\,k1c + I1\,k2c + I2\,k2c + \sqrt{-4\,I1\,I2\,k1c\,k2c + (I1\,k2c + I2(k1c + k2c))^2}}{8\,I1\,I2\pi^2}} \quad (16)$$

wherein $$I1 = \frac{gf1^2 k1b\,k2a + gf2^2 k1b\,k2a + \sqrt{k1b\,k2a^2(gf1^4 k1b + gf2^4 k1b - 2\,gf1^2\,gf2^2(k1b + 2k2a))}}{8\,gf1^2 gf2^2 k2a\pi^2} - I1e$$

$$I2 = \frac{gf1^2 k1b\,k2a + gf2^2 k1b\,k2a - \sqrt{k1b\,k2a^2(gf1^4 k1b + gf2^4 k1b - 2\,gf1^2\,gf2^2(k1b + 2k2a))}}{8\,gf1^2 gf2^2 (k1b + k2a)\pi^2} - I2e$$

The target frequencies calculated in the present embodiment are values with which all the oscillators can be adjusted and with which the adjustment amount becomes smallest.

With the present embodiment, not only the yield can be improved but also the adjustment speed can be increased.

Specifically, the target frequency can be used in the design mask patterns for the silicon micromachining.

Here, in this embodiment, the following values are taken.
gf1: 2362 Hz
gf2: 4724 Hz
k1c: 0.00202N/m
k2c: 0.00106N/m
k1a: 0.00202*0.98N/m
k1b: 0.00202*1.02N/m
k2a: 0.00106*0.97N/m
k2a: 0.00106*1.03N/m
I1e=64.1*$10^{14}$ kg/$m^2$
I1e=5.7*10 kg/$m^2$ The target frequency of the first oscillator in this case is tf1=2273.45 Hz, and the target frequency of the second oscillator is tf2=4525.68 Hz.

These parameters are not limited to the values mentioned above, and any other values may be used.

Furthermore, although in the present embodiment the driving resonance frequencies gf1 and gf2 are set to certain values, certain ranges may be set in place of it.

In that occasion, within the expected ranges of gf1 and gf2, those having a target frequency most apart from gf1 or gf2 may preferably be chosen as the target frequency. However, the target frequency may be calculated using the center of the range of gf1 and gf2.

Furthermore, in this embodiment, the minimums at the lower limit side of the first and second inertia moments are chosen as the parameters I1−I1e and I2−I2e, while the maximums at the upper limit side of them are chosen as the parameters I1+I1e and I2+I2e.

However, those values larger than the minimums at the lower limit side may be chosen as I1−I1e and I2−I2e, and those values smaller than the maximums at the upper limit side may be chosen as I1+I1e and I2+I2e.

Preferably, the dispersion of the inertia moments may be statistically evaluated based on experiments to be made beforehand, and the range of dispersion may be determined based on the standard deviation.

In that occasion, some oscillators will become non-adjustable. However, since the adjustment amount in most adjustable oscillator devices can be smaller, the process time of the second step will be shortened.

Embodiment 7

A seventh embodiment will be described with reference to a structural example of an optical instrument using an optical deflector which is comprised of an oscillator device according to the present invention.

Figure 7:
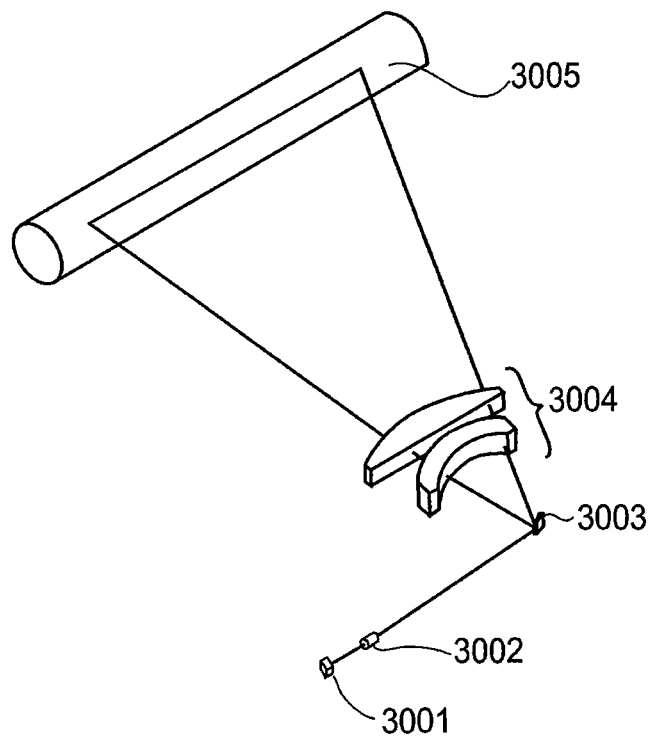
FIG. 7 is s perspective view for explaining the structure of an image forming apparatus according to a seventh embodiment of the present invention.
Figure 8:
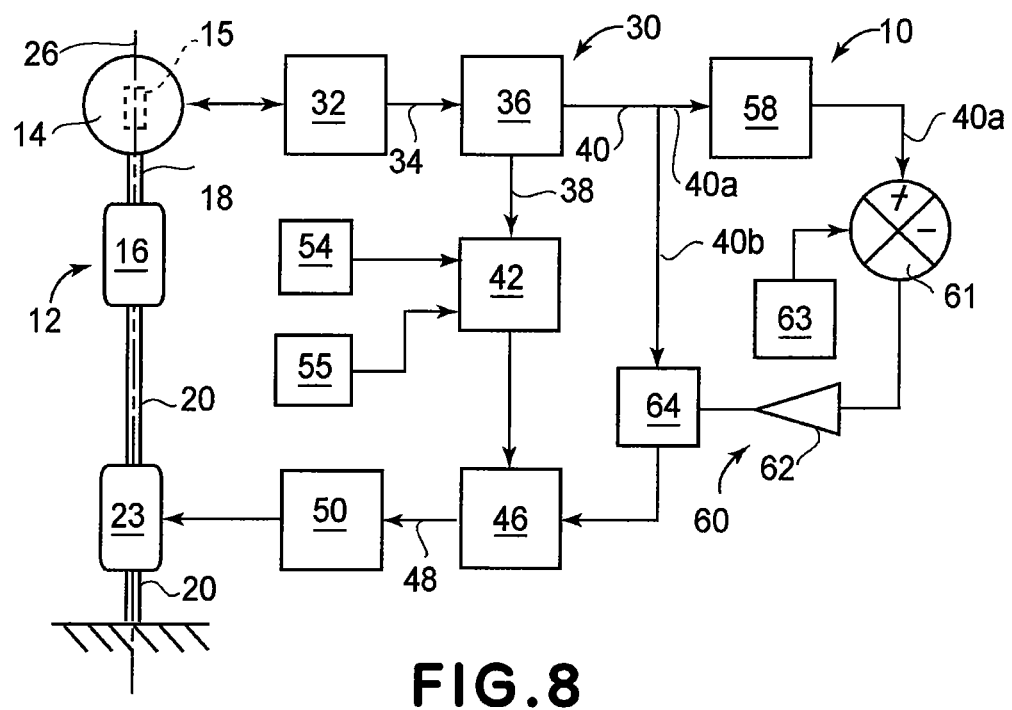
FIG. 8 is a diagram for explaining a micromirror which realizes approximately chopping-wave-like driving, disclosed in U.S. Pat. No. 5,047,630 as a conventional example.
Figure 9:
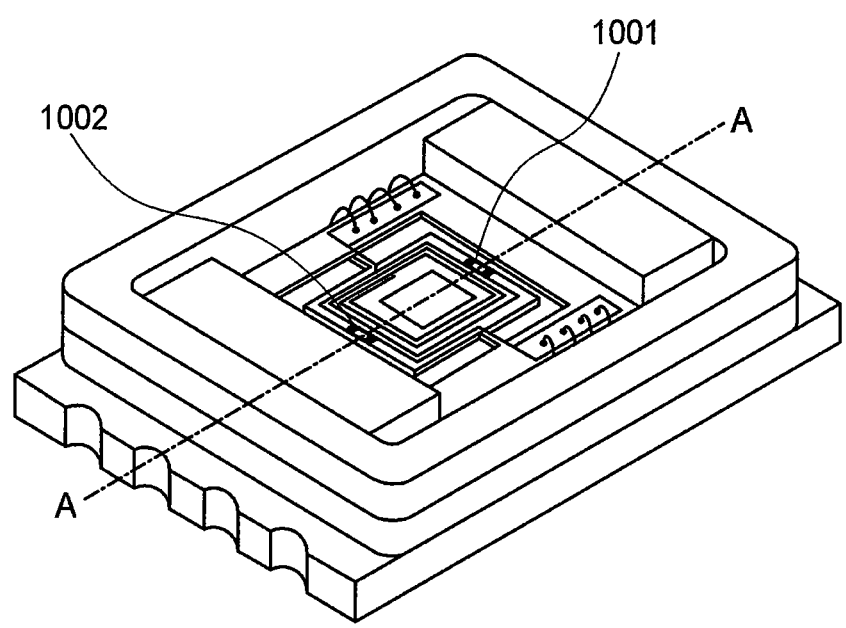
FIG. 9 is a diagram for explaining a planar type galvano mirror disclosed in Japanes Laid-Open Patent Application No. 2002-40355 as a conventional example.

FIG. 7 is a schematic and perspective diagram for explaining the structural example of an optical instrument using an optical deflector which is comprised of an oscillator device according to the present embodiment.

Here, and image forming apparatus is shown as an optical instrument.

In FIG. 7, denoted at 3003 is an oscillator device of the present invention, and denoted at 3001 is a laser source. Denoted at 3002 is a lens or lens group, and denoted at 3004 is a writing lens or lens group. Denoted at 3005 is a photosensitive member of drum shape.

The image forming apparatus of the present embodiment includes a light source, a photosensitive member and an optical deflector which has an optical deflecting element disposed on an oscillator and is comprised of an oscillator device of the present invention.

Light from the light source is deflected by the optical deflector, and at least a portion of the light is incident on the photosensitive member.

More specifically, by means of the optical scanning system (oscillator device) 3003 which is comprised of an oscillator device according to any one of the preceding embodiment, the input light is scanned one-dimensionally. The laser beam projected from the laser source 3001 has received predetermined intensity modulation related to the timing of scanning deflection of the light.

The thus intensity-modulated light goes through the lens or lens group 3002 and, by means of the optical scanning system (optical deflector) 3003, the input light is one-dimensionally scanned.

Through the writing lens 3004, the scanning laser beam forms an image upon the photosensitive member 3005.

The photosensitive member 3005 which is rotated in a direction perpendicular to the scan direction and around a rotational axis, is being uniformly charged by a charging device (not shown). When the photosensitive member surface is scanned with light, an electrostatic latent image is formed on the portion scanned by the light.

Subsequently, a toner image is formed on the imagewise portion of the electrostatic latent image, by means of a developing device (not shown). The toner image is then transferred to and fixed on a paper sheet (not shown), whereby an image is produced on the paper sheet.

Although in the foregoing description the invention has been explained with reference to examples of image forming apparatus as an optical instrument, the present invention is not limited to such structure.

For example, it may include a light source, an image display member and an optical deflector which is comprised of an oscillator device of the present invention, and a projection display device may be constituted thereby, arranging so that light from the light source is deflected by the optical deflector and is incident on the image display member.

Thus, in accordance with the oscillator device of the present invention, an oscillator device suitably applicable to optical instruments including a projection display device for projecting an image based on scanning deflection of light and an image forming apparatus such as a laser beam printer, digital copying machine or the like, having an electrophotographic process, can be accomplished.

While the invention has been described with reference to the structures disclosed herein, it is not confined to the details set forth and this application is intended to cover such modifications or changes as may come within the purposes of the improvements or the scope of the following claims.

The invention claimed is:

1. A method of manufacturing an oscillator device having first and second oscillators supported by a fixed member for torsional oscillation around a torsional axis through first and second torsion springs, the oscillator device being driven at first and second driving resonance frequencies gf1 and gf2, said method comprising:

a first step for processing the two oscillators, wherein, when the two oscillators are going to be processed as oscillators having first and second resonance frequencies different from the two driving resonance frequencies with a certain dispersion range, the two oscillators are so processed that the first and second resonance frequencies different from the two driving resonance frequencies become equal to first and second resonance frequencies f1 and f2, respectively, which are included in adjustable resonance frequency ranges, respectively; and a second step for adjusting the first and second resonance frequencies f1 and f2 so that they become equal to the first and second driving resonance frequencies gf1 and gf2, respectively, wherein, for manufacture of the oscillator device at said first step, when first and second spring constants of the first and second torsion springs under the first and second driving resonance frequencies gf1 and gf2 are denoted by k1 and k2, respectively, minimums at a lower limit side of the first and second spring constants are denoted by k1a and k2a, respectively, and maximums at an upper limit side of the first and second spring constants are denoted by k1b and k2b, respectively, and where the first and second torsion springs are made in spring constant ranges which are expressed by $k1a < k1 < k1b$ $k2a < k2 < k2b,$ the oscillator device is made so that the first and second resonance frequencies f1 and f2 of all oscillators to be produced individually are put in resonance frequency ranges which satisfy equation (1) to equation (4) below:

$$f2 \geq \frac{1}{2\pi}\sqrt{\frac{k1b}{I1}\left(1 + \frac{k2a}{k1b - 4f1^2 I1 \pi^2}\right)} \quad (1)$$

wherein $$I1 = \frac{gf1^2 k1b\, k2a + gf2^2 k1b\, k2a + \sqrt{k1b\, k2a^2(gf1^4 k1b + gf2^4 k1b - 2gf1^2 gf2^2(k1b + 2k2a))}}{8 gf1^2 gf2^2 k2a \pi^2}$$

$$f2 \leq \frac{1}{2\pi}\sqrt{-\frac{k1a\, k2b(k2b - 4f1^2 I2\pi^2)}{I2(-k1a\, k2b + 4f1^2 I2(k1a + k2b)\pi^2)}} \quad (2)$$

wherein $$I2 = \frac{gf1^2 k1a\, k2b + gf2^2 k1a\, k2b - \sqrt{k1a\, k2b^2(gf1^4 k1a + gf2^4 k1a - 2gf1^2 gf2^2(k1a + 2k2b))}}{8 gf1^2 gf2^2 (k1a + k2b)\pi^2}$$

$f1 < gf1$ (3)

$f2 < gf2.$ (4)

2. A method of manufacturing an oscillator device having first and second oscillators supported by a fixed member for torsional oscillation around a torsional axis through first and second torsion springs, the oscillator device being driven at first and second driving resonance frequencies gf1 and gf2, said method comprising:

a first step for processing the two oscillators, wherein, when the two oscillators are going to be processed as oscillators having first and second resonance frequencies different from the two driving resonance frequencies with a certain dispersion range, the two oscillators are so processed that the first and second resonance frequencies different from the two driving resonance frequencies become equal to first and second resonance frequencies f1 and f2, respectively, which are included in adjustable resonance frequency ranges, respectively; and a second step for adjusting the first and second resonance frequencies f1 and f2 so that they become equal to the first and second driving resonance frequencies gf1 and gf2, respectively, wherein, for manufacture of the oscillator device at said first step, when first and second spring constants of the first and second torsion springs under the first and second driving resonance frequencies gf1 and gf2 are denoted by k1 and k2, respectively, minimums at a lower limit side of the first and second spring constants are denoted by k1a and k2a, respectively, and maximums at an upper limit side of the first and second spring constants are denoted by k1b and k2b, respectively, the first and second torsion springs are made in spring constant ranges which are expressed by $k1a < k1 < k1b$ $k2a < k2 < k2b,$ and wherein, when the center of the range of the spring constant k1 is at k1c while the center of the range of the spring constant k2 is at k2c, and when first and second production target resonance frequencies for processing the oscillator device to obtain the first and second resonance frequencies f1 and f2 are denoted by tf1 and tf2, respectively, said method comprises a step of calculating tf1 in accordance with equation (5) below and calculating tf2 in accordance with equation (6) below, and processing the oscillator device so that the calculated tf1 and tf2 are reached:

$$tf1 = \sqrt{\frac{I2k1c + I1k2c + I2k2c - \sqrt{-4I1\,I2\,k1c\,k2c + (I1\,k2c + I2(k1c + k2c))^2}}{8\,I1\,I2\pi^2}} \quad (5)$$

wherein $$I1 = \frac{gf1^2 k1b\,k2a + gf2^2 k1b\,k2a + \sqrt{k1b\,k2a^2(gf1^4 k1b + gf2^4 k1b - 2\,gf1^2\,gf2^2(k1b + 2k2a))}}{8\,gf1^2 gf2^2 k2a\pi^2}$$

$$I2 = \frac{gf1^2 k1b\,k2a + gf2^2 k1b\,k2a - \sqrt{k1b\,k2a^2(gf1^4 k1b + gf2^4 k1b - 2\,gf1^2\,gf2^2(k1b + 2k2a))}}{8\,gf1^2 gf2^2 (k1b + k2a)\pi^2}$$

$$tf2 = \sqrt{\frac{I2k1c + I1k2c + I2k2c + \sqrt{-4I1\,I2\,k1c\,k2c + (I1\,k2c + I2(k1c + k2c))^2}}{8\,I1\,I2\pi^2}} \quad (6)$$

wherein $$I1 = \frac{gf1^2 k1a\,k2b + gf2^2 k1a\,k2b + \sqrt{k1a\,k2b^2(gf1^4 k1a + gf2^4 k1a - 2\,gf1^2\,gf2^2(k1a + 2k2b))}}{8\,gf1^2 gf2^2 k2b\pi^2}$$

$$I2 = \frac{gf1^2 k1a\,k2b + gf2^2 k1a\,k2b - \sqrt{k1a\,k2b^2(gf1^4 k1a + gf2^4 k1a - 2\,gf1^2\,gf2^2(k1a + 2k2b))}}{8\,gf1^2 gf2^2 (k1a + k2b)\pi^2}.$$

3. A method of manufacturing an oscillator device having first and second oscillators supported by a fixed member for torsional oscillation around a torsional axis through first and second torsion springs, the oscillator device being driven at first and second driving resonance frequencies gf1 and gf2, said method comprising:
   a first step for processing the two oscillators, wherein, when the two oscillators are going to be processed as oscillators having first and second resonance frequencies different from the two driving resonance frequencies with a certain dispersion range, the two oscillators are so processed that the first and second resonance frequencies different from the two driving resonance frequencies become equal to first and second resonance frequencies f1 and f2, respectively, which are included in adjustable resonance frequency ranges, respectively; and
   a second step for adjusting the first and second resonance frequencies f1 and f2 so that they become equal to the first and second driving resonance frequencies gf1 and gf2, respectively
   wherein, for manufacture of the oscillator device at said first step, when first and second spring constants of the first and second torsion springs under the first and second driving resonance frequencies gf1 and gf2 are denoted by k1 and k2, respectively, minimums at a lower limit side of the first and second spring constants are denoted by k1a and k2a, respectively, and maximums at an upper limit side of the first and second spring constants are denoted by k1b and k2b, respectively, the first and second torsion springs are made in spring constant ranges which are expressed by $k1a<k1<k1b$ $k2a<k2<k2b$, wherein, when the inertia moments of the first and second oscillators under the driving resonance frequencies gf1 and gf2 are denoted by I1 and I2, respectively, minimums at a lower limit side of the first and the second inertia moments are denoted by I1−I1e and I2−I2e, respectively, while maximums of the first and second inertia moments at an upper limit side are denoted by I1+I1e and I2+I2e, respectively, the first and second oscillators are made in inertia moment ranges which are expressed by $I1-I1e<I1<I1+I1e$ $I2-I2e<I2<I2+I2e$, and wherein, when the center of the aforementioned range of spring constant k1 is at k1c, the center of the aforementioned range of spring constant k2 is at k2c, and first and second production target resonance frequencies for processing the oscillator device to obtain the resonance frequencies f1 and f2 are denoted by tf1 and tf2, respectively, said method comprises a step of calculating tf1 in accordance with equation (7) below and calculating tf2 in accordance with equation (8) below, and processing the oscillator device so that the calculated tf1 and tf2 are reached:

$$tf1 = \sqrt{\frac{I2k1c + I1k2c + I2k2c - \sqrt{-4I1\,I2\,k1c\,k2c + (I1\,k2c + I2(k1c + k2c))^2}}{8\,I1\,I2\pi^2}} \quad (7)$$

wherein $$I1 = \frac{gf1^2 k1b\,k2a + gf2^2 k1b\,k2a + \sqrt{k1b\,k2a^2(gf1^4 k1b + gf2^4 k1b - 2\,gf1^2\,gf2^2(k1b + 2k2a))}}{8\,gf1^2 gf2^2 k2a\pi^2} + I1e$$

$$I2 = \frac{gf1^2 k1b\,k2a + gf2^2 k1b\,k2a - \sqrt{k1b\,k2a^2(gf1^4 k1b + gf2^4 k1b - 2\,gf1^2\,gf2^2(k1b + 2k2a))}}{8\,gf1^2 gf2^2 (k1b + k2a)\pi^2} + I2e$$

$$tf2 = \sqrt{\frac{I2k1c + I1k2c + I2k2c + \sqrt{-4I1\,I2\,k1c\,k2c + (I1\,k2c + I2(k1c + k2c))^2}}{8\,I1\,I2\pi^2}} \quad (8)$$

wherein $$I1 = \frac{gf1^2 k1a\,k2b + gf2^2 k1a\,k2b + \sqrt{k1a\,k2b^2(gf1^4 k1a + gf2^4 k1a - 2\,gf1^2\,gf2^2(k1a + 2k2b))}}{8\,gf1^2 gf2^2 k2b\pi^2} + I1e$$

$$I2 = \frac{gf1^2 k1a\,k2b + gf2^2 k1a\,k2b - \sqrt{k1a\,k2b^2(gf1^4 k1a + gf2^4 k1a - 2\,gf1^2\,gf2^2(k1a + 2k2b))}}{8\,gf1^2 gf2^2 (k1a + k2b)\pi^2} + I2e.$$

4. A method of manufacturing an oscillator device having first and second oscillators supported by a fixed member for torsional oscillation around a torsional axis through first and second torsion springs, the oscillator device being driven at first and second driving resonance frequencies gf1 and gf2, said method comprising:
   a first step for processing the two oscillators, wherein, when the two oscillators are going to be processed as oscillators having first and second resonance frequencies different from the two driving resonance frequencies with a certain dispersion range, the two oscillators are so processed that the first and second resonance frequencies different from the two driving resonance frequencies become equal to first and second resonance frequencies f1 and f2, respectively, which are included in adjustable resonance frequency ranges, respectively; and a second step for adjusting the first and second resonance frequencies f1 and f2 so that they become equal to the first and second driving resonance frequencies gf1 and gf2, respectively wherein, for manufacture of the oscillator device at said first step, when first and second spring constants of the first and second torsion springs under the first and second driving resonance frequencies gf1 and gf2 are denoted by k1 and k2, respectively, minimums at a lower limit side of the first and second spring constants are denoted by k1a and k2a, respectively, and maximums at an upper limit side of the first and second spring constants are denoted by k1b and k2b, respectively, and where the first and second torsion springs are made in spring constant ranges which are expressed by $$k1a<k1<k1b$$

$$k2a<k2<k2b,$$

the oscillator device is manufactured so that the first and second resonance frequencies f1 and f2 of all oscillators to be produced individually are put in resonance frequency ranges which satisfy equation (9) to equation (12) below:

$$f2 \le \frac{1}{2\pi}\sqrt{\frac{k1a}{I1}\left(1+\frac{k2b}{k1a-4f1^2I1\pi^2}\right)} \quad (9)$$

wherein $$I1 = \frac{gf1^2 k1a k2b + gf2^2 k1a k2b + \sqrt{k1a k2b^2(gf1^4 k1a + gf2^4 k1a - 2gf1^2 gf2^2(k1a+2k2b))}}{8 gf1^2 gf2^2 k2b\pi^2}$$

$$f2 \ge \frac{1}{2\pi}\sqrt{-\frac{k1b k2a(k2a-4f1^2I2\pi^2)}{I2(-k1b k2a+4f1^2I2(k1b+k2a)\pi^2)}} \quad (10)$$

wherein $$I2 = \frac{gf1^2 k1b k2a + gf2^2 k1b k2a - \sqrt{k1b k2a^2(gf1^4 k1b + gf2^4 k1b - 2gf1^2 gf2^2(k1b+2k2a))}}{8 gf1^2 gf2^2 (k1b+k2a)\pi^2}$$

$$f1 > gf1 \quad (11)$$

$$f2 > gf2. \quad (12)$$

5. A method of manufacturing an oscillator device having first and second oscillators supported by a fixed member for torsional oscillation around a torsional axis through first and second torsion springs, the oscillator device being driven at first and second driving resonance frequencies gf1 and gf2, said method comprising:

a first step for processing the two oscillators, wherein, when the two oscillators are going to be processed as oscillators having first and second resonance frequencies different from the two driving resonance frequencies with a certain dispersion range, the two oscillators are so processed that the first and second resonance frequencies different from the two driving resonance frequencies become equal to first and second resonance frequencies f1 and f2, respectively, which are included in adjustable resonance frequency ranges, respectively; and a second step for adjusting the first and second resonance frequencies, f1 and f2 so that they become equal to the first and second driving resonance frequencies gf1 and gf2, respectively, wherein, for manufacture of the oscillator device at said first step, when first and second spring constants of the first and second torsion springs under the first and second driving resonance frequencies gf1 and gf2 are denoted by k1 and k2, respectively, minimums at a lower limit side of the first and second spring constants are denoted by k1a and k2a, respectively, and maximums at an upper limit side of the first and second spring constants are denoted by k1b and k2b, respectively, the first and second torsion springs are made in spring constant ranges which are expressed by $$k1a<k1<k1b$$

$$k2a<k2<k2b,$$

and wherein, when the center of the range of the spring constant k1 is at k1c while the center of the range of the spring constant k2 is at k2c, and when first and second production target resonance frequencies for processing the oscillator device to obtain the first and second resonance frequencies f1 and f2 are denoted by tf1 and tf2, respectively, said method comprises a step of calculating tf1 in accordance with equation (13) below and calculating tf2 in accordance with equation (14) below, and processing the oscillator device so that the calculated tf1 and tf2 are reached:

$$tf1 = \sqrt{\frac{I2 k1c + I1 k2c + I2 k2c - \sqrt{-4 I1 I2 k1c k2c + (I1 k2c + I2(k1c+k2c))^2}}{8 I1 I2\pi^2}} \quad (13)$$

wherein $$I1 = \frac{gf1^2 k1a k2b + gf2^2 k1a k2b + \sqrt{k1a k2b^2(gf1^4 k1a + gf2^4 k1a - 2gf1^2 gf2^2(k1a+2k2b))}}{8 gf1^2 gf2^2 k2b\pi^2}$$

$$I2 = \frac{gf1^2 k1a k2b + gf2^2 k1a k2b - \sqrt{k1a k2b^2(gf1^4 k1a + gf2^4 k1a - 2gf1^2 gf2^2(k1a+2k2b))}}{8 gf1^2 gf2^2 (k1a+k2b)\pi^2}$$

$$tf2 = \sqrt{\frac{I2 k1c + I1 k2c + I2 k2c + \sqrt{-4 I1 I2 k1c k2c + (I1 k2c + I2(k1c+k2c))^2}}{8 I1 I2\pi^2}} \quad (14)$$

wherein $$I1 = \frac{gf1^2 k1b k2a + gf2^2 k1b k2a + \sqrt{k1b k2a^2(gf1^4 k1b + gf2^4 k1b - 2gf1^2 gf2^2(k1b+2k2a))}}{8 gf1^2 gf2^2 k2a\pi^2}$$

$$I2 = \frac{gf1^2 k1b k2a + gf2^2 k1b k2a - \sqrt{k1b k2a^2(gf1^4 k1b + gf2^4 k1b - 2gf1^2 gf2^2(k1b+2k2a))}}{8 gf1^2 gf2^2 (k1b+k2a)\pi^2}.$$

6. A method of manufacturing an oscillator device having first and second oscillators supported by a fixed member for torsional oscillation around a torsional axis through first and second torsion springs, the oscillator device being driven at first and second driving resonance frequencies gf1 and gf2, said method comprising:
- a first step for processing the two oscillators, wherein, when the two oscillators are going to be processed as oscillators having first and second resonance frequencies different from the two driving resonance frequencies with a certain dispersion range, the two oscillators are so processed that the first and second resonance frequencies different from the two driving resonance frequencies become equal to first and second resonance frequencies f1 and f2, respectively, which are included in adjustable resonance frequency ranges, respectively; and
- a second step for adjusting the first and second resonance frequencies f1 and f2 so that they become equal to the first and second driving resonance frequencies gf1 and gf2, respectively wherein, for manufacture of the oscillator device at said first step, when first and second spring constants of the first and second torsion springs under the first and second driving resonance frequencies gf1 and gf2 are denoted by k1 and k2, respectively, minimums at a lower limit side of the first and second spring constants are denoted by k1a and k2a, respectively, and maximums at an upper limit side of the first and second spring constants are denoted by k1b and k2b, respectively, the first and second torsion springs are made in spring constant ranges which are expressed by $$k1a < k1 < k1b$$

$$k2a < k2 < k2b,$$

wherein, when the inertia moments of the first and second oscillators under the driving resonance frequencies gf1 and gf2 are denoted by I1 and I2, respectively, minimums at a lower limit side of the first and the second inertia moments are denoted by I1−I1e and I2−I2e, respectively, while maximums of the first and second inertia moments at an upper limit side are denoted by I1+I1e and I2+I2e, respectively, the first and second oscillators are made in inertia moment ranges which are expressed by $$I1 - I1e < I1 < I1 + I1e$$

$$I2 - I2e < I2 < I2 + I2e,$$

and wherein, when the center of the aforementioned range of spring constant k1 is at k1c, the center of the aforementioned range of spring constant k2 is at k2c, and first and second production target resonance frequencies for processing the oscillator device to obtain the resonance frequencies f1 and f2 are denoted by tf1 and tf2, respectively, said method comprises a step of calculating tf1 in accordance with equation (15) below and calculating tf2 in accordance with equation (16) below, and processing the oscillator device so that the calculated tf1 and tf2 are reached:

$$tf1 = \sqrt{\frac{I2\,k1c + I1\,k2c + I2\,k2c - \sqrt{-4\,I1\,I2\,k1c\,k2c + (I1\,k2c + I2(k1c + k2c))^2}}{8\,I1\,I2\pi^2}} \qquad (15)$$

wherein $$I1 = \frac{gf1^2 k1a\,k2b + gf2^2 k1a\,k2b + \sqrt{k1a\,k2b^2(gf1^4 k1a + gf2^4 k1a - 2\,gf1^2\,gf2^2(k1a + 2\,k2b))}}{8\,gf1^2 gf2^2 k2b\pi^2} - I1e$$

$$I2 = \frac{gf1^2 k1a\,k2b + gf2^2 k1a\,k2b - \sqrt{k1a\,k2b^2(gf1^4 k1a + gf2^4 k1a - 2\,gf1^2\,gf2^2(k1a + 2\,k2b))}}{8\,gf1^2 gf2^2 (k1a + k2b)\pi^2} - I2e$$

$$tf2 = \sqrt{\frac{I2\,k1c + I1\,k2c + I2\,k2c + \sqrt{-4\,I1\,I2\,k1c\,k2c + (I1\,k2c + I2(k1c + k2c))^2}}{8\,I1\,I2\pi^2}} \qquad (16)$$

wherein $$I1 = \frac{gf1^2 k1b\,k2a + gf2^2 k1b\,k2a + \sqrt{k1b\,k2a^2(gf1^4 k1b + gf2^4 k1b - 2\,gf1^2\,gf2^2(k1b + 2\,k2a))}}{8\,gf1^2 gf2^2 k2a\pi^2} - I1e$$

$$I2 = \frac{gf1^2 k1b\,k2a + gf2^2 k1b\,k2a - \sqrt{k1b\,k2a^2(gf1^4 k1b + gf2^4 k1b - 2\,gf1^2\,gf2^2(k1b + 2\,k2a))}}{8\,gf1^2 gf2^2 (k1b + k2a)\pi^2} - I2e.$$

* * * * *